(12) United States Patent
Sako

(10) Patent No.: US 11,264,632 B2
(45) Date of Patent: Mar. 1, 2022

(54) FLOW BATTERY

(71) Applicant: Panasonic Intellectual Property Management Co., Ltd., Osaka (JP)

(72) Inventor: Honami Sako, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 149 days.

(21) Appl. No.: 16/808,367

(22) Filed: Mar. 4, 2020

(65) Prior Publication Data
US 2020/0203750 A1 Jun. 25, 2020

Related U.S. Application Data

(63) Continuation of application No. PCT/JP2019/011626, filed on Mar. 20, 2019.

(30) Foreign Application Priority Data

May 18, 2018 (JP) .............................. JP2018-096463

(51) Int. Cl.
*H01M 8/04186* (2016.01)
*H01M 8/18* (2006.01)

(52) U.S. Cl.
CPC ....... *H01M 8/188* (2013.01); *H01M 8/04186* (2013.01)

(58) Field of Classification Search
CPC .......................... H01M 8/188; H01M 8/04186
See application file for complete search history.

(56) References Cited

U.S. PATENT DOCUMENTS

| 9,012,901 | B2 | 4/2015 | Suzuka et al. | |
|---|---|---|---|---|
| 9,051,232 | B2 | 6/2015 | Kosuge et al. | |
| 2014/0178735 | A1* | 6/2014 | Wang | H01M 8/20 429/105 |
| 2015/0255803 | A1* | 9/2015 | Delnick | H01M 4/9041 429/498 |
| 2018/0026293 | A1 | 1/2018 | Fujimoto et al. | |

(Continued)

FOREIGN PATENT DOCUMENTS

| JP | 2010-126511 | 6/2010 |
|---|---|---|
| JP | 2012-190664 | 10/2012 |

(Continued)

OTHER PUBLICATIONS

Ebert et al. (Reductive Alkylation of Aromatic Compounds Perylene, Decacyclene, and Dibenzothiophene, ChemInform, 1988, vol. 19, pp. 109-126).*

(Continued)

*Primary Examiner* — Olatunji A Godo
(74) *Attorney, Agent, or Firm* — McDermott Will and Emery LLP

(57) ABSTRACT

The flow battery according to the present disclosure comprises an anode and a cathode. The cathode comprises a first electrode, a first liquid, a first active material, and a first circulation mechanism. The first liquid is in contact with the first active material and the first electrode. The first circulation mechanism is configured to circulate the first liquid between the first electrode and the first active material. The first liquid includes perylene or the derivative thereof.

18 Claims, 7 Drawing Sheets

(56) References Cited

U.S. PATENT DOCUMENTS

| | | |
|---|---|---|
| 2018/0048004 A1 | 2/2018 | Hojo |
| 2018/0097247 A1 | 4/2018 | Nariyama et al. |
| 2018/0097248 A1 | 4/2018 | Nariyama et al. |

FOREIGN PATENT DOCUMENTS

| | | |
|---|---|---|
| JP | 2014-524124 | 9/2014 |
| JP | 2018-018816 | 2/2018 |
| JP | 2018-060782 | 4/2018 |
| JP | 2018-060783 | 4/2018 |
| WO | 2013/012391 | 1/2013 |
| WO | 2016/208123 | 12/2016 |

OTHER PUBLICATIONS

International Search Report of PCT application No. PCT/JP2019/011626 dated Jun. 18, 2019.

\* cited by examiner

FLOW BATTERY

BACKGROUND

1. Technical Field

The present disclosure relates to a flow battery.

2. Description of the Related Art

Patent Literature 1 discloses a redox flow battery system which has an energy store containing a redox mediator. Patent Literature 2 discloses a flow battery using a redox substance.

CITATION LIST

Patent Literature

Patent Literature 1: Japanese Patent Application Publication No. 2014-524124
Patent Literature 2: WO 2016/208123

SUMMARY

An object of the present disclosure is to provide a flow battery having a high discharge potential using a high potential solid cathode active material.

The present disclosure provides a flow battery comprising:
an anode; and
a cathode,
wherein
the cathode comprises a first electrode, a first liquid, a first active material, and a first circulation mechanism,
the first liquid is in contact with the first active material and the first electrode;
the first circulation mechanism is configured to circulates the first liquid between the first electrode and the first active material; and
the first liquid contains perylene or the derivative thereof.

The present disclosure provides a flow battery using a high potential cathode active material.

DETAILED DESCRIPTION OF THE EMBODIMENT

Hereinafter, embodiments of the present disclosure will be described with reference to the drawings.

First Embodiment

Figure 1:
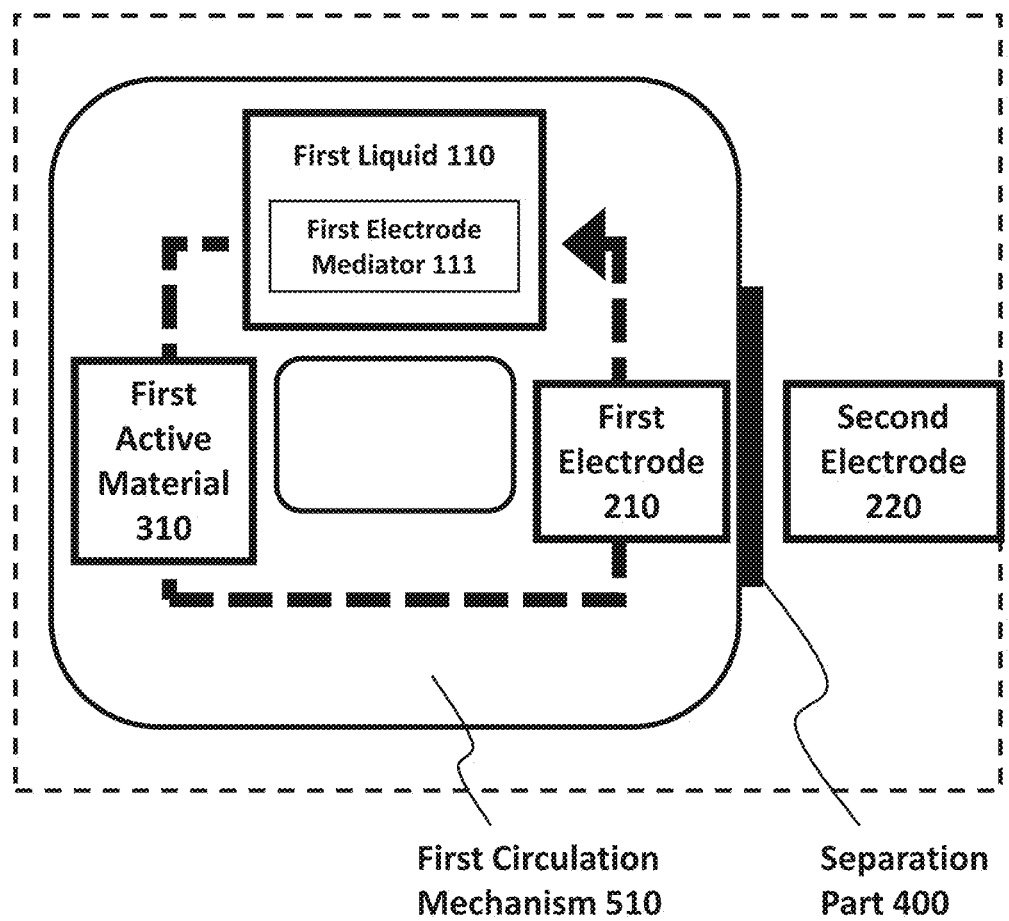
FIG. 1 shows a block diagram of a flow battery in a first embodiment.

FIG. 1 shows a block diagram of a flow battery 1000 in the first embodiment.

The flow battery 1000 in the first embodiment comprises an anode and a cathode. The cathode includes a first liquid 110, a first electrode 210, a first active material 310, and a first circulation mechanism 510.

The first liquid 110 is a liquid in which a first electrode mediator 111 has been dissolved. The first liquid 110 is in contact with the first active material 310 and the first electrode 210.

The first electrode 210 is an electrode immersed in the first liquid 110.

The first active material 310 is an active material immersed in the first liquid 110.

The first circulation mechanism 510 circulates the first liquid 110 between the first electrode 210 and the first active material 310.

The first electrode mediator 111 is perylene or the derivative thereof. The derivative of perylene means a perylene molecule including one or more substituents or atoms other than hydrogen atoms.

As will be described later, perylene or the derivative thereof has a redox potential of approximately not less than 3.85 volts and not more than 3.91 volts. Thus, if perylene or the derivative thereof is used in combination with a solid active material having a redox potential of approximately not more than 3.85 volts (e.g., $LiNiO_2$ or $LiMn_2O_4$), perylene or the derivative thereof functions as a charge mediator. On the other hand, if perylene or the derivative thereof is used in combination with a solid active material (for example, $LiMn_2O_4$, $LiCoO_2$, or $LiNi_{0.5}Mn_{1.5}O_4$) having a redox potential of approximately not less than 3.95 volts, perylene or the derivative thereof functions as a discharge mediator.

Therefore, an active material having a high equilibrium potential is allowed to be used as the first active material 310, and a flow battery having a higher discharge potential can be realized. The active material having a high equilibrium potential may be, for example, an active material having an equilibrium potential of approximately 3.8 to 4.5 V vs $Li/Li^+$.

Since the first electrode mediator 111 is perylene or the derivative thereof, a flow battery in which the active material is used, however, is not circulated can be realized. As a result, as the first active material 310, a high capacity powder active material can be used for charge/discharge reaction, for example. As a result, a high energy density and a high capacity can be realized.

Since the first electrode mediator 111 is perylene or the derivative thereof, only the first liquid 110 in which the first electrode mediator 111 has been dissolved can be circulated without circulating the powder active material itself. As a result, occurrence of clogging in a pipe by the powder active material can be suppressed. Therefore, a flow battery having a long cycle life can be realized.

In the flow battery 1000 according to the first embodiment, the derivative of perylene is represented by the following general formula (1):

[Chem. 1]

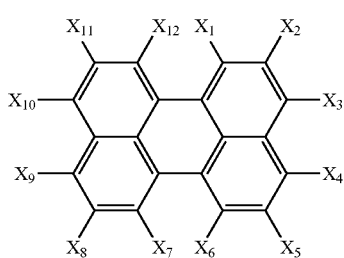

(1)

where

X1 to X12 each independently represent a hydrogen atom, a fluorine atom, a chlorine atom, a bromine atom, a cyano group, a nitro group, a chain saturated hydrocarbon group, a chain unsaturated hydrocarbon group, a cyclic saturated hydrocarbon carbon, a cyclic unsaturated hydrocarbon group, $COR_1$, or $N(R_2)_2$. However, a case where $X_1$ to $X_{12}$ are all simultaneously hydrogen atoms is excluded. $R_1$ and $R_2$ each independently represent at least one selected from the group consisting of a hydrogen atom, a chain saturated hydrocarbon group, a chain unsaturated hydrocarbon group, a cyclic saturated hydrocarbon group, a cyclic unsaturated hydrocarbon group, a cyano group, a nitro group, and the combination thereof.

In the flow battery 100 including the derivative of perylene represented by the general formula (1), since a high potential solid cathode active material can be used, a flow battery having a high discharge voltage can be realized. The chain saturated hydrocarbon group, the chain unsaturated hydrocarbon group, the cyclic saturated hydrocarbon group, and the cyclic unsaturated hydrocarbon group may include at least one selected from the group consisting of an oxygen atom, a nitrogen atom, a sulfur atom, and a silicon atom.

The derivative of perylene may be a derivative of perylene represented by the following general formula (2):

[Chem. 2]

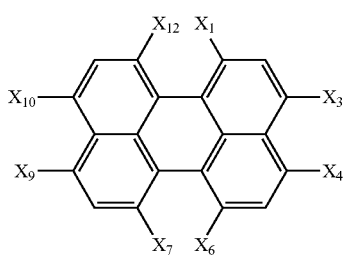

(2)

where $X_1$, $X_3$, $X_4$, $X_6$, $X_7$, $X_9$, $X_{10}$, and $X_{12}$ each independently represent a hydrogen atom, a fluorine atom, a chlorine atom, a bromine atom, a cyano group, a nitro group, a chain saturated hydrocarbon group, a chain unsaturated hydrocarbon group, a cyclic saturated carbon, a cyclic unsaturated hydrocarbon group, $COR_1$, or $N(R_2)_2$. However, a case where $X_1$, $X_3$, $X_4$, $X_6$, $X_7$, $X_9$, $X_{10}$, and $X_{12}$ are all simultaneously hydrogen atoms is excluded. $R_1$ and $R_2$ are each independently any one of a hydrogen atom, a chain saturated hydrocarbon group, a chain unsaturated hydrocarbon group, a cyclic saturated hydrocarbon group, a cyclic unsaturated hydrocarbon group, a cyano group, or a nitro group.

The derivative of perylene may be a derivative of perylene represented by the following general formula (3):

[Chem. 3]

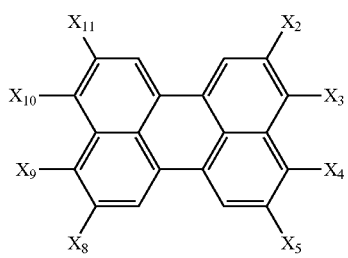

(3)

where $X_2$ to $X_5$ and $X_8$ to $X_{11}$ each independently represent a hydrogen atom, a fluorine atom, a chlorine atom, a bromine atom, a cyano group, a nitro group, a chain saturated hydrocarbon group, a chain unsaturated hydrocarbon group, a cyclic saturated carbon, a cyclic unsaturated hydrocarbon group, $COR_1$, or $N(R_2)_2$. However, a case where $X_2$ to $X_5$ and $X_8$ to $X_{11}$ are all simultaneously hydrogen atoms is excluded. $R_1$ and $R_2$ are each independently any one of a hydrogen atom, a chain saturated hydrocarbon group, a chain unsaturated hydrocarbon group, a cyclic saturated hydrocarbon group, a cyclic unsaturated hydrocarbon group, a cyano group, or a nitro group.

The derivative of perylene may be a derivative of perylene represented by the following general formula (4):

[Chem. 4]

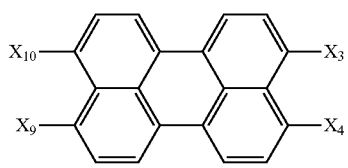

(4)

where $X_3$, $X_4$, $X_9$ and $X_{10}$ each independently represent a hydrogen atom, a fluorine atom, a chlorine atom, a bromine atom, a cyano group, a nitro group, a chain saturated hydrocarbon group, a chain unsaturated hydrocarbon group, a cyclic saturated carbon, a cyclic unsaturated hydrocarbon group, $COR_1$, or $N(R_2)_2$. However, a case where $X_3$, $X_4$, $X_9$ and $X_{10}$ are all simultaneously hydrogen atoms is excluded. $R_1$ and $R_2$ are each independently any one of a hydrogen atom, a chain saturated hydrocarbon group, a chain unsaturated hydrocarbon group, a cyclic saturated hydrocarbon group, a cyclic unsaturated hydrocarbon group, a cyano group, or a nitro group.

In the flow battery 1000 in the first embodiment, the first electrode mediator 111 may be perylene represented by the following formula (5).

[Chem. 5]

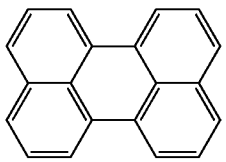

(5)

Since the first electrode mediator 111 is perylene or the derivative thereof, a flow battery having a discharge potential (vs. Li/Li$^+$) of not less than 3.5 volts can be realized.

In order to increase the discharge potential of the flow battery 1000 in the first embodiment, in the derivative of perylene represented by the general formula (1), $X_1$ to $X_{12}$ are each independently at least one selected from the group consisting of a hydrogen atom, a chain saturated hydrocarbon group, a chain unsaturated hydrocarbon group, a cyclic saturated hydrocarbon group, a cyclic unsaturated hydrocarbon group, a combination thereof, $COR_1$, and $N(R_2)_2$. However, the case where $X_1$ to $X_{12}$ are all simultaneously hydrogen atoms is excluded.

$R_1$ and $R_2$ may include at least one element selected from the group consisting of boron, nitrogen, oxygen, fluorine, silicon, phosphorus, sulfur, chlorine, bromine, and iodine (namely, $R_1$ and $R_2$ may include at least one element selected from the group consisting of nonmetallic elements).

The chain saturated hydrocarbon group may be a chain saturated hydrocarbon group having not less than 1 and not more than 10 carbon atoms.

Examples of the chain saturated hydrocarbon group having not less than 1 and not more than 10 carbon atoms include a methyl group, an ethyl group, an n-propyl group, an isopropyl group, an n-butyl group, an isobutyl group, an n-pentyl group, an n-hexyl group, an n-heptyl group, an n-octyl group, an n-nonyl group, and n-decyl group.

The chain unsaturated hydrocarbon group may be a chain unsaturated hydrocarbon group having not less than 2 and not more than 6 carbon atoms.

Examples of the chain unsaturated hydrocarbon group having not less than 2 and not more than 6 carbon atoms include a vinyl group, a 1-propenyl group, a 2-propenyl group, a 1-methyl-1-ethenyl group, a 1-butenyl group, a 2-butenyl group, a 3-butenyl group, a 2-methyl-1-propenyl group, a 1-ethylethenyl group, a 1-methyl-1-propenyl group, a 1-methyl-2-propenyl group, a 1-pentenyl group, a 2-pentenyl group, a 3-pentenyl group, a 4-pentenyl group, a 1-n-propylethenyl group, a 1,1-dimethyl-2-propenyl group, a 1-i-propylethenyl group, a 1,2-dimethyl-1-propenyl group, a 1-hexenyl group, a 2-hexenyl group, a 3-hexenyl group, a 4-hexenyl group, a 5-hexenyl group, and a 1-methyl-1-pentenyl group.

The cyclic saturated hydrocarbon group may be a cyclic saturated hydrocarbon group having not less than 5 and not more than 12 carbon atoms.

Examples of the cyclic saturated hydrocarbon group having not less than 5 and not more than 12 carbon atoms include a cyclopentyl group, a cyclohexyl group, a cycloheptyl group, a cyclooctane group, a cyclodecyl group, a cycloundecyl group, and a cyclododecyl group.

The cyclic unsaturated hydrocarbon group may be a cyclic unsaturated hydrocarbon group having not less than 5 and not more than 12 carbon atoms.

Examples of the cyclic unsaturated hydrocarbon group having not less than 5 and not more than 12 carbon atoms include an aliphatic cyclic unsaturated hydrocarbon group having or not having a side chain such as a cyclopentenyl group, a cyclohexenyl group, a cyclooctenyl group, a cycloundecynyl group, a cyclododecynyl group, a cyclohexadienyl group, a cyclooctadienyl group, a cyclododecenyl group, or a cyclododecatrienyl group; and an aromatic hydrocarbon group having a side chain such as toluene or xylene.

The chain saturated hydrocarbon group, the chain unsaturated hydrocarbon group, the cyclic saturated hydrocarbon group, and the cyclic unsaturated hydrocarbon group may include an ether bond.

In order to increase the discharge potential of the flow battery 1000 in the first embodiment, the derivative of perylene may be at least one selected from the group consisting of the derivatives of perylene represented by the general formulas (2) to (4).

The following Table 1 shows measurement results of the potential of perylene used as the first electrode mediator 111. See also FIG. 5.

TABLE 1

| Name | Structure formula | Electrolyte liquid | Potential [V vs. Li/Li$^+$] | |
|---|---|---|---|---|
| | | | Eox1 | Ered1 |
| Perylene | | 1 mol/L LiBF$_4$/PC | 3.91 | 3.85 |

From Table 1, perylene has a redox potential at not less than 3.85 volts and not more than 3.91 volts (vs. Li/Li$^+$). Therefore, perylene can be used as the charge mediator for a cathode solid active material having an equilibrium potential which is lower than a first oxidation potential, which is a charge potential. Perylene can be used alone as a charge/discharge mediator for the cathode solid active material having an equilibrium potential between the first oxidation potential and a first reduction potential which is the charge potential. In this case, a first-stage oxidation potential (first oxidation potential: $E_1$ox (V vs. Li/Li$^+$)) is a charge potential of the mediator, and a first-stage reduction potential (first reduction potential: $E_1$red (V vs. Li/Li$^+$)) is a discharge potential of the mediator.

As described above, perylene has a redox potential of not less than 3.85 volts and not more than 3.91 volts (vs. Li/Li$^+$). Therefore, the derivative of perylene would have a redox potential of not less than 3.50 volts and not more than 4.50 volts (vs. Li/Li$^+$).

Figure 6:
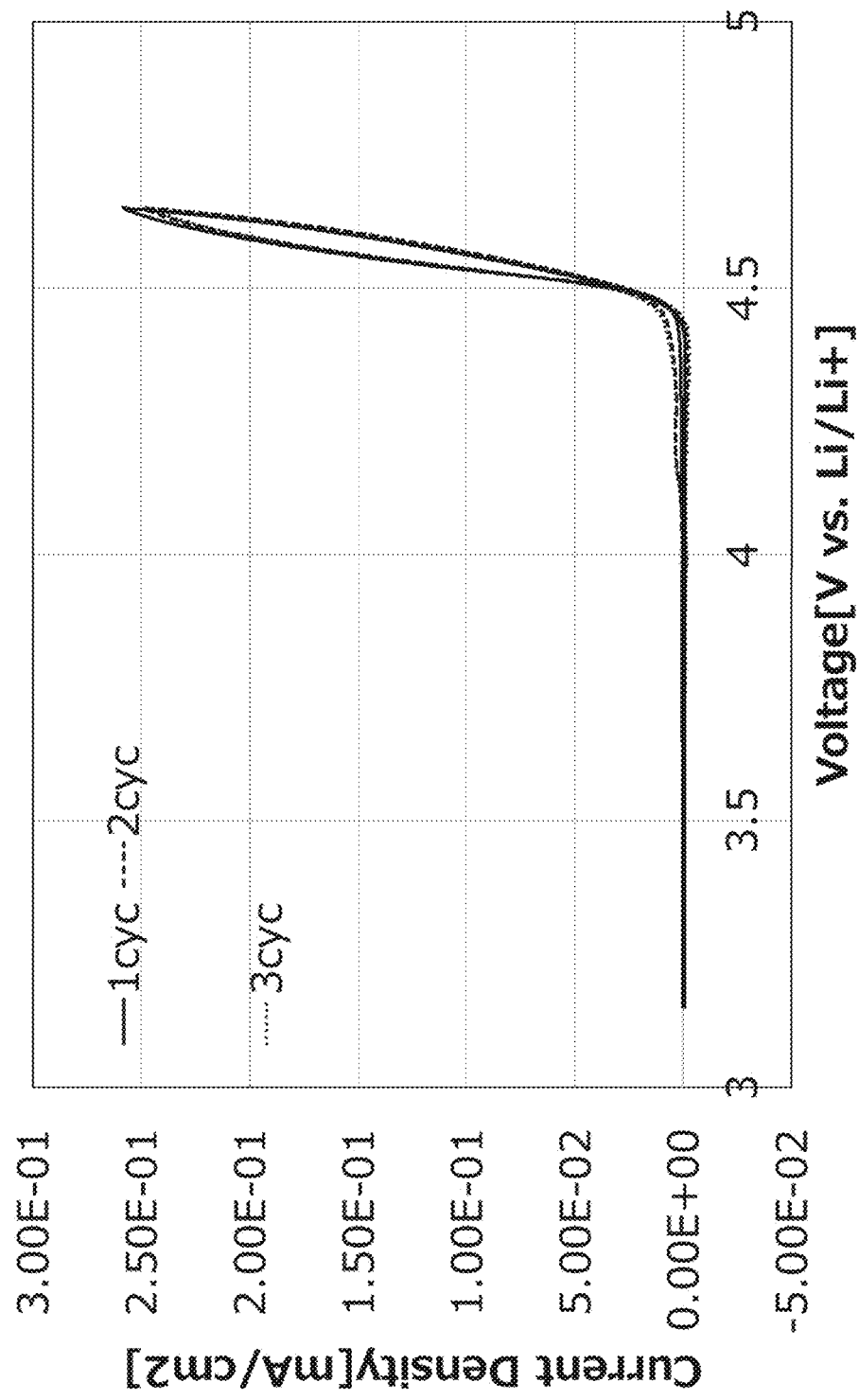
FIG. 6 is a graph showing measurement results of cyclic voltammetry of naphthalene in the comparative example 1.
Figure 7:
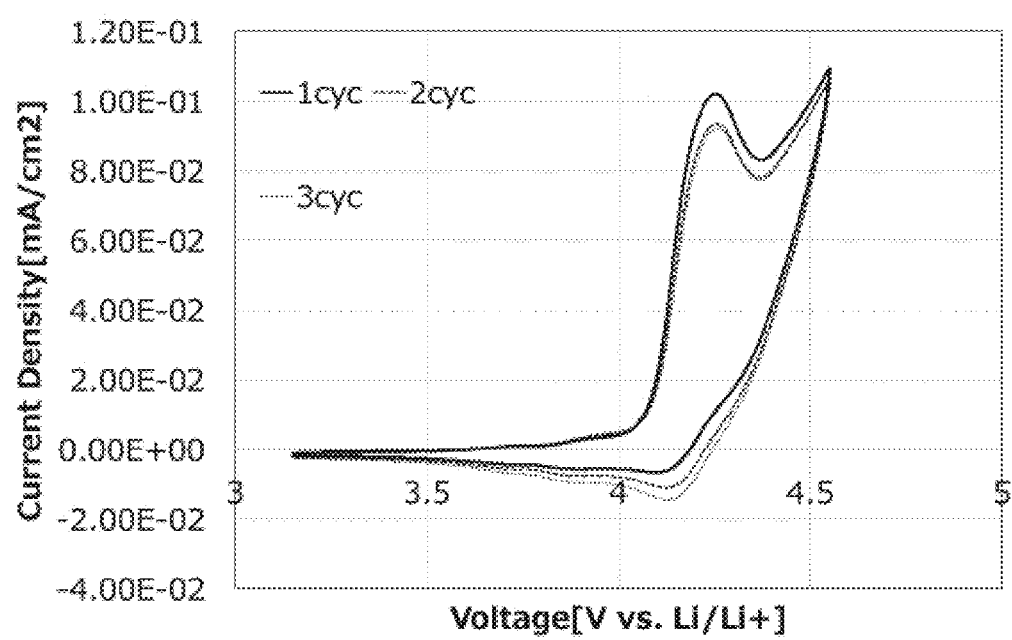
FIG. 7 is a graph showing measurement results of cyclic voltammetry of anthracene in the comparative example 2.

FIGS. 6 and 7 show graphs of cyclic voltammetry of naphthalene and anthracene provided in the comparative examples 1 and 2, which will be described later, respectively. As shown in these two graphs, positive current density of naphthalene and anthracene is significantly greater than the negative current density thereof. This reveals that reversibility of the redox reaction of naphthalene and anthracene is low.

Figure 5:
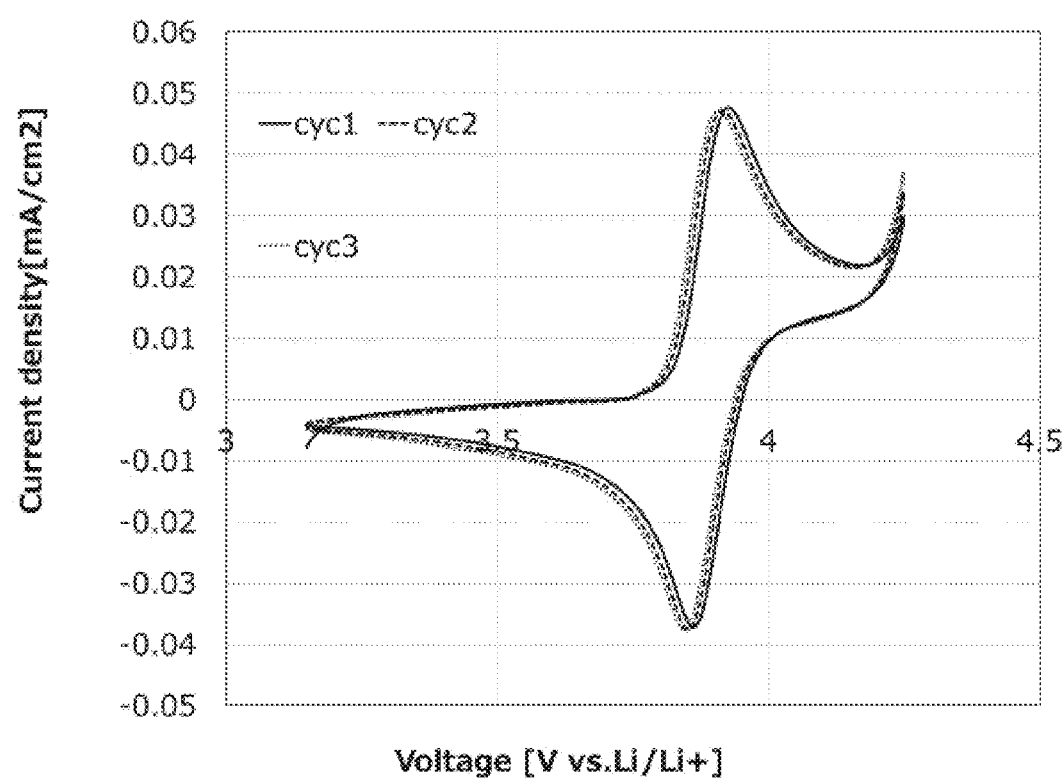
FIG. 5 is a graph showing measurement results of cyclic voltammetry of perylene in the inventive example 1.

FIG. 5 shows a graph of cyclic voltammetry of perylene provided in the inventive example 1, which will be described later. As shown in this graph, the positive current density of perylene is approximately equal to the negative current density thereof. This reveals that the reversibility of the redox reaction of perylene is high. Therefore, compared to naphthalene and anthracene, perylene and the derivative thereof are suitable as mediators for a flow battery.

Perylene has a first redox potential which is approximately 0.5 V higher than that of tetrathiafulvalene or a conventional cathode discharge mediator.

The discharge potential of the flow battery is determined by the potential of the discharge mediator in the cathode. As a result, if perylene or the derivative thereof, which has a discharge potential of higher potential, according to the first embodiment is used, the flow battery which has a higher discharge potential can be realized.

In the flow battery 1000 according to the first embodiment, the first electrode mediator 111 may include only one kind of perylene or the derivative thereof according to the first embodiment.

In the flow battery 1000 according to the first embodiment, the first electrode mediator 111 may include two or more kinds of perylene or the derivative thereof according to the first embodiment.

As described above, the derivative of perylene in the first embodiment has the first oxidation potential $E_1ox$ and the first reduction potential $E_1red$.

In this case, the equilibrium potential (V vs. Li/Li$^+$) of the first active material 310 may be lower than the first oxidation potential $E_1ox$ and higher than the first reduction potential $E_1red$.

By using, as the first active material 310, an active material having an equilibrium potential which is higher than the first reduction potential $E_1red$, perylene or the derivative thereof in the first embodiment can function as the discharge mediator. In other words, by using, as the first active material 310, an active material having a potential which is higher than the first reduction potential $E_1red$, perylene or the derivative thereof in the first embodiment can function as the discharge mediator. By using, as the first active material 310, an active material having an equilibrium potential which is lower than the first oxidation potential $E_1ox$, perylene or the derivative thereof in the first embodiment can function as the charge mediator. In other words, by using, as the first active material 310, an active material having a potential which is lower than the first oxidation potential $E_1ox$, perylene or the derivative thereof in the first embodiment can function as the charge mediator.

In the flow battery 1000 according to the first embodiment, the first active material 310 may be a metal oxide represented by $Li_xM_yO_2$. Here, M is at least one selected from the group consisting of Ni, Mn, and Co. The values of x and y are arbitrary values. The metal oxide has an equilibrium potential of not less than 3.8 volts and not more than 4.4 volts.

In the flow battery 1000 in the first embodiment, the first active material 310 may be at least one selected from the group consisting of $LiFePO_4$, $LiMnO_2$, $LiMn_2O_4$, and $LiCoO_2$.

The equilibrium potential of $LiCoO_2$ is 3.9 V vs. Li/Li$^+$. In this case, if a compound having a discharge potential which is higher than the equilibrium potential of $LiCoO_2$ and having a charge potential which is lower than the equilibrium potential of $LiCoO_2$ is used as the first electrode mediator 111 which is the charge/discharge mediator, a mediator-type cathode using $LiCoO_2$ as an active material is provided. In this case, the smaller is the potential difference between the equilibrium potential of $LiCoO_2$ and the charge/discharge potential of the first electrode mediator 111, the better is charge/discharge energy efficiency. For example, if the discharge potential of the first electrode mediator 111 is lower than the equilibrium potential of $LiCoO_2$ and closer to the equilibrium potential of $LiCoO_2$, the discharge potential of the flow battery is higher. On the other hand, if the condition cannot be satisfied with only one kind of mediator, it is necessary to use two or more kinds of mediators in order to perform charge/discharge.

Therefore, if $LiCoO_2$ is used as the first active material 310, the discharge potential of the flow battery can be further increased by using at least one perylene or the derivative thereof as the charge mediator of the first electrode mediator 111 and by using, as the discharge mediator, a heteroaromatic compound and a cyclopentadienyl compound which perform one or more steps of redox reactions reversibly at a potential of 3.78 V vs. Li/Li$^+$. The charge mediator may be perylene, the derivative of perylene represented by the general formula (1), the derivative of perylene represented by the general formula (2), the derivative of perylene represented by the general formula (3), or the derivative of perylene represented by the general formula (4). The cyclopentadienyl compound used as the discharge mediator may be 1,1'-dibromoferrocene. In this case, compared with a case where $LiFePO_4$, which has a discharge potential of approximately 3.5 V, is used as the cathode solid active material, the discharge potential can be increased by approximately 0.4 to 0.5 volts.

Perylene or a derivative of perylene may be used as the charge mediator. In this case, a mediator substance having a redox potential which is lower than the equilibrium potential of the cathode solid active material may be used as the discharge mediator.

In other words, in the flow battery 1000 according to the first embodiment, the discharge mediator may be further dissolved in the first liquid 110. In other words, the first electrode mediator may further include the discharge mediator. Hereinafter, the discharge mediator is referred to as a first electrode discharge mediator.

In this case, the equilibrium potential of the first active material 310 may be lower than the oxidation potential Eox of perylene or the derivative thereof.

Further, the equilibrium potential of the first active material 310 may be higher than the equilibrium potential of the first electrode discharge mediator.

By using, as the first active material 310, an active material having an equilibrium potential which is lower than the oxidation potential Eox of perylene or the derivative thereof, the perylene or the derivative in the first embodiment can function as the charge mediator. In other words, by using, as the first active material 310, an active material having a potential which is lower than the oxidation potential Eox, perylene or the derivative thereof in the first embodiment can function as the charge mediator. By using, as the first active material 310, an active material having an equilibrium potential which is higher than the equilibrium potential of the first electrode discharge mediator, the first electrode discharge mediator can function as the discharge mediator. In other words, the first electrode discharge mediator can function as the discharge mediator, by using, as the first active material 310, an active material having a potential which is higher than the equilibrium potential of the first electrode discharge mediator.

As the first electrode discharge mediator, a heteroaromatic compound such as tetrathiafulvalene or triphenylamine, and/or a cyclopentadienyl compound such as ferrocene may be used.

Perylene or the derivative thereof may be used as the discharge mediator. In this case, a mediator substance having a redox potential which is higher than the equilibrium potential of the cathode solid active material may be used as the charge mediator.

A solid active material may be used as the first active material 310. The solid active material may be, for example, a powder active material. If the tank is filled with the first active material 310 in a powder state without processing, the manufacturing can be simplified and the manufacturing cost can be decreased.

As the first active material 310, a pellet-shaped active material may be used. The pellet-shaped active material may be, for example, an active material provided by pelletizing powder. If the tank is filled with the first active material 310 in the form of pellets, the manufacturing can be simplified and the manufacturing cost can be decreased.

As the first active material 310, an active material solidified in a pellet shape with a known binder may be used. The binder may be, for example, polyvinylidene fluoride, polypropylene, polyethylene, or polyimide.

The first active material 310 may be a material which is insoluble in the first liquid 110. Accordingly, a flow battery in which the first electrode mediator 111 is circulated together with the first liquid 110, however, the first active material 310 is not circulated can be realized.

In the flow battery 1000 according to the first embodiment, the first liquid 110 may be at least one selected from the group consisting of propylene carbonate (hereinafter, referred to as "PC"), ethylene carbonate (hereinafter, referred to as "EC"), γ-butyrolactone dimethyl carbonate (hereinafter, referred to as "DMC"), ethyl methyl carbonate (hereinafter, referred to as "EMC"), fluoroethylene carbonate (hereinafter, referred to as "FEC"), and diethyl carbonate (hereinafter, referred to as "DEC"). The first liquid 110 may be an ether solvent. Examples of the ether solvent include tetrahydrofuran (hereinafter, referred to as "THF"), 2-methyltetrahydrofuran (hereinafter, referred to as "2MeTHF"), dimethoxyethane (hereinafter, referred to as "DME"), 1,3-dioxane (hereinafter, referred to as "1,3DO") and 4-methyl-1,3-dioxane (hereinafter, referred to as "4Me1,3DO").

In the flow battery 1000 according to the first embodiment, the first liquid 110 may be an electrolyte liquid including an electrolyte using the material of the first liquid 110 as a solvent. The electrolyte (i.e., electrolyte salt) may be at least one kind selected from the group consisting of $LiBF_4$, $LiPF_6$, and $LiN(CF_3SO_2)_2$. The solvent may have a high dielectric constant, low reactivity with Li ions, and a potential window up to approximately 4V.

In the flow battery 1000 according to the first embodiment, the first electrode 210 may be a cathode electrode, and the second electrode 220 may be an anode electrode.

In the flow battery 1000 according to the first embodiment, for example, the first liquid 110 is brought into contact with the first electrode 210, and the first electrode mediator 111 is oxidized or reduced by the first electrode 210.

The first electrode 210 may be an electrode having a surface which acts as a reaction field of the first electrode mediator 111.

In this case, a material which is stable with respect to the first liquid 110 may be used as the first electrode 210. The material which is stable with respect to the first liquid 110 may be, for example, a material which is insoluble in the first liquid 110. Furthermore, a material which is stable against an electrochemical reaction which is an electrode reaction may be used as the first electrode 210. For example, as the first electrode 210, a metal, or carbon may be used. The metal may be, for example, stainless steel, iron, copper, or nickel.

The first electrode 210 may have a structure with an increased surface area thereof. Example of the structure with the increased surface area may be a mesh, a nonwoven fabric, a surface roughening process board, and a sintered porous body, for example. These increase the surface area of the first electrode 210. Thereby, the oxidation reaction or the reduction reaction of the first electrode mediator 111 can be further facilitated.

The second electrode 220 may comprise a current collector and an active material which is provided on the current collector. Thereby, a high capacity active material can be used. As the active material of the second electrode 220, a compound having a property of reversibly occluding and releasing lithium ions can be used.

The second electrode 220 may be formed of a lithium metal. If a lithium metal is used as the second electrode 220, it is easy to control dissolution and precipitation as a metal cathode, and a high capacity can be realized.

The flow battery 1000 according to the first embodiment may further comprise a separation part 400.

The separation part 400 separates the first electrode 210 and the first liquid 110 from the second electrode 220.

The separation part 400 may be a microporous membrane and/or a porous body used in a known secondary battery.

The separation part 400 may be a porous membrane such as glass paper in which glass fibers have been woven into a nonwoven fabric.

The separation part 400 may be a membrane having ion conductivity such as lithium ion conductivity. For example, the separation part 400 may be an ion exchange resin membrane or a solid electrolyte membrane. The ion exchange resin membrane may be, for example, a cation exchange membrane or an anion exchange membrane.

The first circulation mechanism 510 circulates the first liquid 110 between the first electrode 210 and the first active material 310.

Using the first circulation mechanism 510, the first electrode mediator 111 can be circulated together with the first liquid 110 between the first electrode 210 and the first active material 310. Thereby, the oxidation reaction and reduction reaction between the materials can be performed more efficiently.

The first circulation mechanism 510 may be, for example, a mechanism comprising a pipe, a tank, a pump, and a valve.

A specific example of the first circulation mechanism 510 will be described later in the second embodiment.

<Description of Charge/Discharge Process>

The charge/discharge Process of the flow battery 1000 in the first embodiment will be described on the basis of the following operation example.

In the present operation example, the first electrode 210 is a cathode electrode and is formed of carbon black.

In the present operation example, the first liquid 110 is an ether solution in which the first electrode mediator 111 has been dissolved.

In the present operation example, the first electrode mediator 111 is perylene or the derivative thereof (hereinafter, referred to as Perylene).

In the present operation example, the first active material 310 is lithium cobaltate ($LiCoO_2$).

In the present operation example, the second electrode 220 is an anode electrode and is formed of a lithium metal.

[Description of Charge Process]

First, the charge reaction will be described.

The charge is performed by applying a voltage between the first electrode 210 and the second electrode 220.

(Reaction on Anode)

By applying a voltage, electrons are supplied from the outside of the flow battery to the second electrode 220 included in the anode. Thereby, a reduction reaction occurs on the second electrode 220 included in the anode. In other words, the anode is in a charged state.

For example, in the present operation example, the following reaction occurs.

$$Li^+ + e^- \rightarrow Li$$

(Reaction on Cathode)

By applying the voltage, oxidation reaction of the first electrode mediator 111 occurs on the first electrode 210 included in the cathode. In other words, the first electrode mediator 111 is oxidized on the surface of the first electrode 210. Thereby, electrons are emitted from the first electrode 210 to the outside of the flow battery.

For example, in the present operation example, the following reaction occurs.

$$Perylene \rightarrow Perylene^+ + e^-$$

The first electrode mediator 111 which has been oxidized on the first electrode 210 is moved to the first active material 310 by the first circulation mechanism 510. In other words, the first electrode mediator 111 which has been oxidized on the first electrode 210 is supplied to the first active material 310 by the first circulation mechanism 510.

In this case, the first electrode mediator 111 which has been oxidized on the first electrode 210 is reduced by the first active material 310. In other words, the first active material 310 is oxidized by the first electrode mediator 111. As a result, the first active material 310 releases lithium ions.

For example, in the present operation example, the following reaction occurs.

$$LiCoO_2 + Perylene^+ \rightarrow CoO_2 + Li^+ + Perylene$$

The first electrode mediator 111 which has been reduced by the first active material 310 is moved to the first electrode 210 by the first circulation mechanism 510. In other words, the first electrode mediator 111 which has been reduced by the first active material 310 is supplied to the first electrode 210 by the first circulation mechanism 510.

At this time, the first electrode mediator 111 is oxidized on the surface of the first electrode 210.

For example, in the present operation example, the following reaction occurs.

$$Perylene \rightarrow Perylene^+ + e^-$$

A part of lithium ions ($Li^+$) generated from the first active material 310 can move to the second electrode 220 through the separation part 400.

As described above, the first electrode mediator 111 does not change, if viewed from a total reaction including the circulation.

On the other hand, the first active material 310 located away from the first electrode 210 will be in the charged state.

As described above, on the first electrode 210, $Perylene^+$ serves as the charge mediator as the first electrode charge mediator.

In the fully charged state, $Perylene^+$ is present in the first liquid 110, and the first active material 310 is $CoO_2$. At this time, the charge potential is determined by the oxidation potential to $Perylene^+$.

The above charge reaction can proceed, until either the first active material 310 reaches the fully charged state or the second electrode 220 reaches the fully charged state.

[Description of Discharge Process]

Next, the discharge reaction from the full charge will be described.

In the full charge, the first active material 310 and the second electrode 220 are in the charged state.

In the discharge reaction, electric power is extracted from between the first electrode 210 and the second electrode 220.

(Reaction on Anode)

On the second electrode 220 which is an anode, an oxidation reaction occurs. In other words, the anode is in a discharged state.

Thereby, electrons are emitted from the second electrode 220 to the outside of the flow battery.

For example, in the present operation example, the following reaction occurs.

$$Li \rightarrow Li^+ + e^-$$

(Reaction on Cathode)

By discharging the battery, electrons are supplied from the outside of the flow battery to the first electrode 210 included in the cathode.

As a result, a reduction reaction of the first electrode mediator 111 occurs on the first electrode 210.

In other words, the first electrode mediator 111 is reduced on the surface of the first electrode 210.

For example, in the present operation example, the following reaction occurs.

$$Perylene^+ + e^- \rightarrow Perylene$$

The first electrode mediator 111 which has been reduced on the first electrode 210 is moved to the first active material 310 by the first circulation mechanism 510. In other words, the first electrode mediator 111 which has been reduced on the first electrode 210 is supplied to the first active material 310 by the first circulation mechanism 510.

At this time, the first electrode mediator 111 which has been reduced on the first electrode 210 is oxidized by the first active material 310. In other words, the first active material 310 is reduced by the first electrode mediator 111. Thereby, the first active material 310 occludes lithium.

For example, in the present operation example, the following reaction occurs.

$$CoO_2 + Li^+ + Perylene \rightarrow LiCoO_2 + Perylene^+$$

The first electrode mediator 111 which has been oxidized by the first active material 310 is moved to the first electrode 210 by the first circulation mechanism 510. In other words, the first electrode mediator 111 which has been oxidized by the first active material 310 is supplied to the first electrode 210 by the first circulation mechanism 510.

In this case, the first electrode mediator 111 is reduced on the surface of the first electrode 210.

For example, in the present operation example, the following reaction occurs.

$$Perylene^+ + e^- \rightarrow Perylene$$

A part of the lithium ions ($Li^+$) can be supplied from the second electrode 220 through the separation part 400.

As described above, the first electrode mediator 111 does not change, if viewed from the total reaction including the circulation.

On the other hand, the first active material 310 located away from the first electrode 210 is in the discharged state.

As described above, on the first electrode 210, Perylene serves as the discharge mediator as the first electrode discharge mediator.

In the fully discharged state, Perylene is present in the first liquid 110, and the first active material 310 is $LiCoO_2$. At this time, the discharge potential is determined by the reduction potential to Perylene.

The above discharge reaction can proceed, until either the first active material 310 reaches the fully discharged state or the second electrode 220 reaches the fully discharged state.

Second Embodiment

Hereinafter, a second embodiment will be described. The description which has been set forth in the first embodiment is omitted as appropriate.

Figure 2:
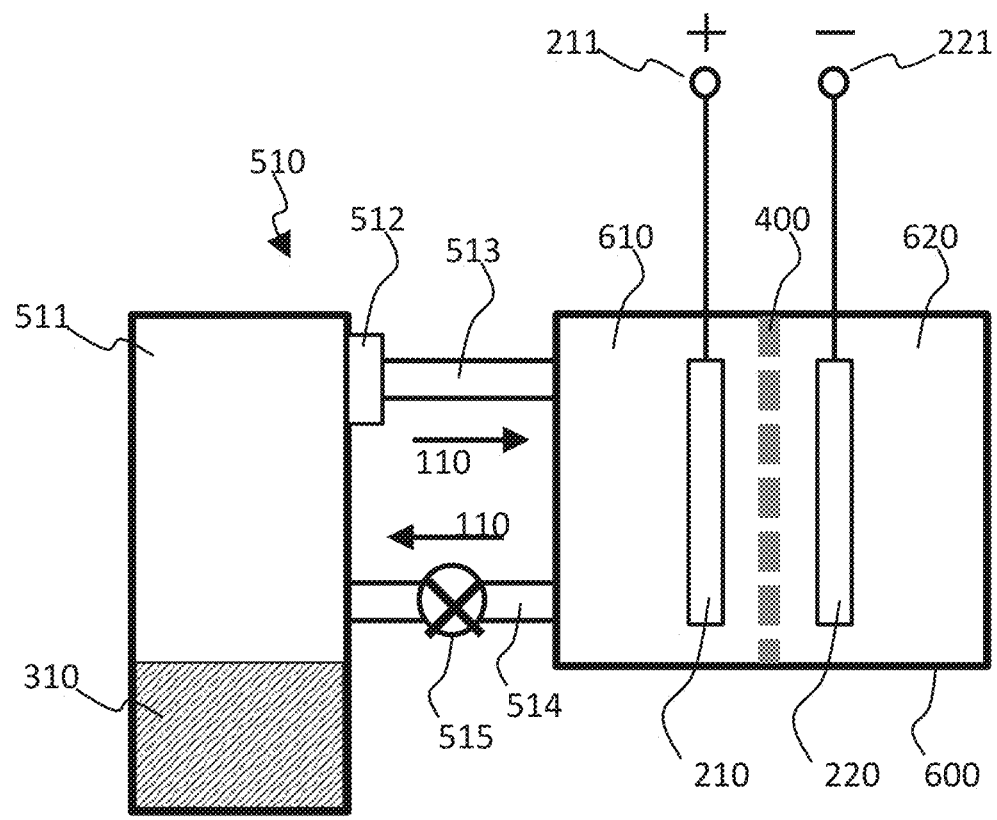
FIG. 2 shows a schematic diagram of a flow battery in a second embodiment.

FIG. 2 is a schematic diagram of a flow battery 2000 according to the second embodiment.

The flow battery 2000 in the second embodiment comprises not only the flow battery 1000 in the first embodiment but also an electrochemical reaction part 600.

The electrochemical reaction part 600 comprises a cathode chamber 610 and an anode chamber 620. The cathode further comprises a first storage part 511. The cathode chamber 610 comprises a first electrode 210 in the inside thereof. The first storage part 511 comprises a first active material 310 in the inside thereof. The anode comprises an anode chamber 620.

The first active material 310 is contained in the first storage part 511. A part of the first liquid 110 is contained in the first storage part 511.

The first circulation mechanism 510 circulates the first liquid 110 between the cathode chamber 620 and the first storage part 511.

The first active material 310 and the first liquid 110 are brought into contact with each other in the first storage part 511, and either the oxidation reaction or the reduction reaction of the first electrode mediator 111 by the first active material 310 is performed.

Since the first liquid 110 and the first active material 310 can be brought into contact with each other in the first storage part 511, a contact area between the first liquid 110 and the first active material 310 can be further increased. A contact time between the first liquid 110 and the first active material 310 can be made longer. As a result, the oxidation reaction and reduction reaction of the first electrode mediator 111 by the first active material 310 can be performed more efficiently.

In the second embodiment, the first storage part 511 may be a tank, for example.

The first storage part 511 may contain, for example, in an interspace between the filled first active materials 310, the first liquid 110 in which the first electrode mediator 111 has been dissolved.

The first storage part 511 may contain, for example, in an interspace between the filled first active materials 310, the first liquid 110 in which the first electrode mediator 111 has been dissolved.

As shown in FIG. 2, the flow battery 2000 in the second embodiment may further comprise the electrochemical reaction part 600, a cathode terminal 211, and an anode terminal 221.

The electrochemical reaction part 600 is separated into the cathode chamber 610 and the anode chamber 620 by the separation part 400.

The cathode chamber 610 is provided with a cathode electrode. In FIG. 2, the first electrode 210 is disposed in the cathode chamber 610.

The cathode terminal 211 is connected to the cathode electrode.

The anode chamber 620 is provided with an anode electrode. In FIG. 2, the second electrode 220 is disposed in the anode chamber 620.

The anode terminal 221 is connected to the anode electrode.

The cathode terminal 211 and the anode terminal 221 are connected to a charge/discharge device, for example. A voltage is applied between the cathode terminal 211 and the anode terminal 221 by the charge/discharge device. Alternatively, electric power is taken out between the cathode terminal 211 and the anode terminal 221.

As shown in FIG. 2, in the flow battery 2000 according to the second embodiment, the first circulation mechanism 510 may comprise a pipe 513, a pipe 514, and a pump 515. In order to distinguish the pipes from each other, the pipe 513 and the pipe 514 may be referred to as a first pipe and a second pipe, respectively.

One end of the pipe 513 is connected to the outlet of the first liquid 110 in the first storage part 511.

The other end of the pipe 513 is connected to a chamber which is either the cathode chamber 610 or the anode chamber 620 and in which the first electrode 210 is disposed. In FIG. 2, the other end of the pipe 513 is connected to the cathode chamber 610.

One end of the pipe 514 is connected to a chamber which is either the cathode chamber 610 or the anode chamber 620 and in which the first electrode 210 is disposed. In FIG. 2, the one end of the pipe 514 is connected to the cathode chamber 610.

The other end of the pipe 514 is connected to the inlet of the first liquid 110 in the first storage part 511.

The pump 515 is provided in the pipe 514, for example. Alternatively, the pump 515 may be provided in the pipe 513.

In the flow battery 2000 according to the second embodiment, the first circulation mechanism 510 may comprise a first filter 512.

The first filter 512 prevents the first active material 310 from passing therethrough.

The first filter 512 is provided in a path through which the first liquid 110 flows out of the first storage part 511 to the first electrode 210. In FIG. 2, the first filter 512 is provided in the pipe 513.

Using the first filter 512, the first active material 310 is prevented from flowing out of the first storage part 511 (for example, toward the first electrode 210). In other words, the first active material 310 stays in the first storage part 511. Thereby, a flow battery in which the first active material 310 itself is not circulated can be realized. As a result, clogging by the first active material 310 inside the member of the first circulation mechanism 510 can be prevented. The member of the first circulation mechanism 510 may be a pipe, for example. The generation of resistance loss due to the first active material 310 flowing out toward the first electrode 210 can be prevented.

For example, the first filter 512 may be provided at a joint part between the first storage part 511 and the pipe 513.

For example, the first filter 512 may be a filter which filters the first active material 310. In this case, the filter may be a member having pores each smaller than the minimum particle size of the particles of the first active material 310. As a material of the filter, a material which does not react with the first active material 310 and the first liquid 110 may be used. The filter may be, for example, a glass fiber filter paper, a polypropylene nonwoven fabric, a polyethylene nonwoven fabric, or a metal mesh which does not react with a lithium metal.

Since the first filter 512 is used, even if the first active material 310 flows together with the flow of the first liquid 110 in the first storage part 511 the first active material 310 is prevented from flowing out of the first storage part 511.

In FIG. 2, the first liquid 110 contained in the first storage part 511 is supplied to the cathode chamber 610 through the first filter 512 and the pipe 513.

As a result, the first electrode mediator 111 dissolved in the first liquid 110 is oxidized or reduced by the first electrode 210.

Subsequently, the first liquid 110 in which the oxidized or reduced first electrode mediator 111 has been dissolved is supplied through the pipe 514 and the pump 515 to the first storage part 511.

In this way, at least one of the oxidation reaction and the reduction reaction of the first electrode mediator 111 dissolved in the first liquid 110 is performed by the first active material 310.

The control of the circulation of the first liquid 110 may be performed by the pump 515, for example. In other words, the pump 515 appropriately starts the supply of the first liquid 110, stops the supply, or adjusts the supply amount.

The control of the circulation of the first liquid 110 may be performed by a means other than the pump 515. The means may be a valve, for example.

In FIG. 2, as one example, the first electrode 210 is included in the cathode, and the second electrode 220 is included in the anode.

Electrolyte liquids and/or solvents having compositions different from each other may be used in the cathode chamber 610 and the anode chamber 620, which are separated with the separation part 400.

Electrolyte liquids and/or solvents having compositions which are the same as each other may be used in the cathode chamber 610 and the anode chamber 620.

Third Embodiment

Hereinafter, the third embodiment will be described. The description which has been set forth in the first embodiment or the second embodiment is omitted as appropriate.

In the third embodiment, the electrolyte liquid is circulated in both the first electrode and the second electrode.

Figure 3:
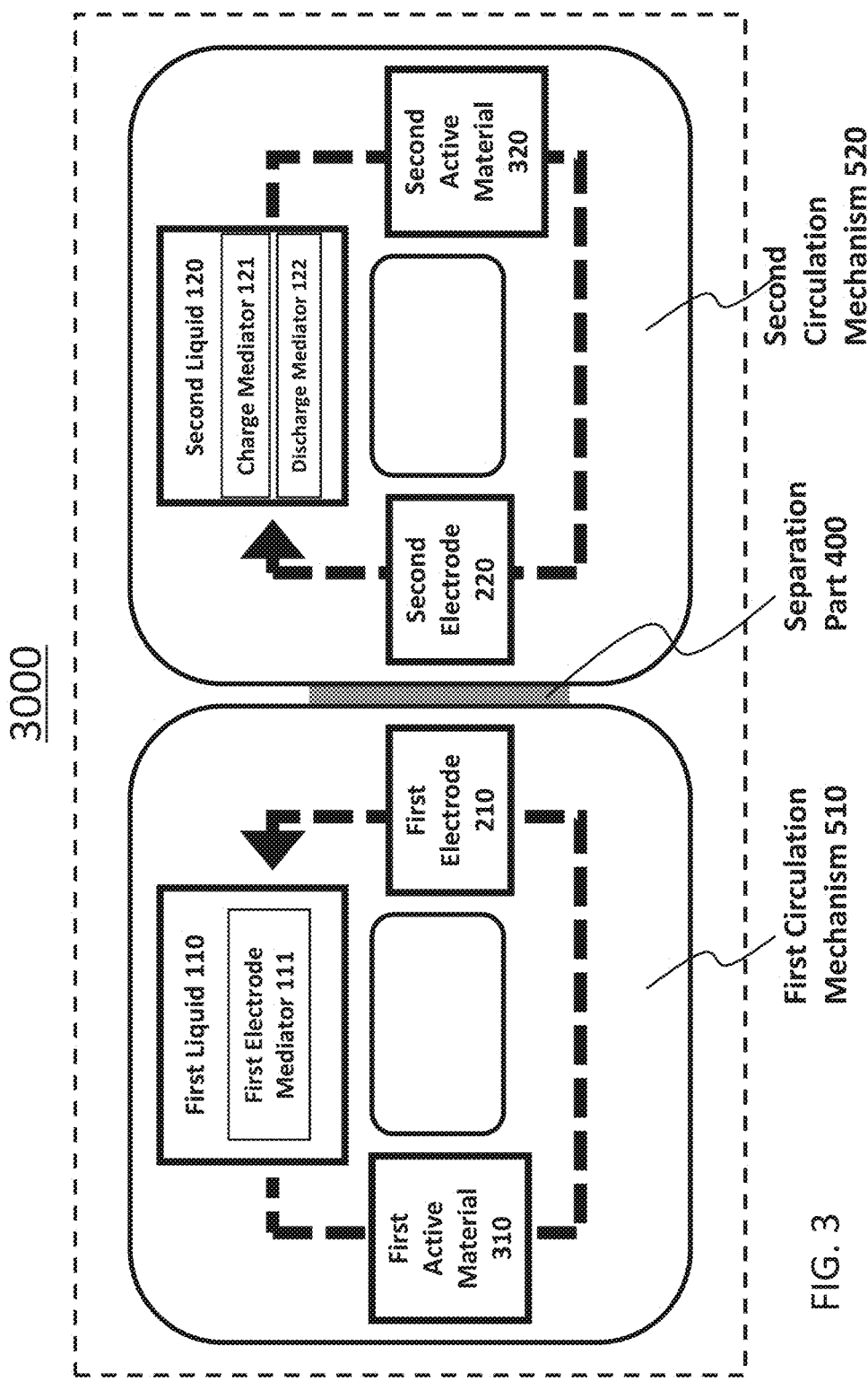
FIG. 3 shows a block diagram of a flow battery in a third embodiment.

FIG. 3 shows a block diagram of a flow battery 3000 in the third embodiment.

The flow battery 3000 in the third embodiment further comprises a separation part 400 as well as the flow battery 1000 in the first embodiment.

The anode of the flow battery 3000 according to the third embodiment further comprises a second liquid 120 and a second active material 320 as well as the second electrode 220.

The second liquid 120 is a liquid in which a charge mediator 121 as a second electrode charge mediator and a discharge mediator 122 as a second electrode discharge mediator have been dissolved. The second liquid 120 is in contact with the second active material 320 and the second electrode 220.

The second electrode 220 is an electrode immersed in the second liquid 120.

The second active material 320 is an active material immersed in the second liquid 120.

The separation part 400 separates the first electrode 210 from the second electrode 220. Similarly, the separation part 400 separates the first liquid 110 from the second liquid 120.

The equilibrium potential of the charge mediator 121 is lower than the equilibrium potential of the second active material 320.

The equilibrium potential of the discharge mediator 122 is higher than the equilibrium potential of the second active material 320.

In this way, a flow battery having higher battery voltage, higher energy density, and longer cycle life can be realized.

In other words, by using an active material having a relatively low equilibrium potential (V vs. Li/Li$^+$) as the second active material 320, a substance having a relatively low equilibrium potential (V vs. Li/Li$^+$) can be used as the discharge mediator 122. The material which has a relatively low equilibrium potential and is used as the second active material 320 may be, for example, graphite. The substance which has a relatively low equilibrium potential and is used as the discharge mediator 122 may be, for example, an aromatic compound or a condensed aromatic compound. Thereby, an anode of the flow battery with a lower potential can be realized. As a result, a flow battery which has a higher battery voltage (namely, a discharge voltage) can be realized.

In this way, a flow battery in which the active material is used; however, is not circulated can be realized. As a result, as the second active material 320, for example, a high capacity powder active material can be used for a charge/discharge reaction. Thereby, a high energy density and a high capacity can be realized.

Furthermore, it is possible to circulate only the second liquid 120 in which the charge mediator 121 and the discharge mediator 122 have been dissolved without circulating the powder active material itself. As a result, the occurrence of the clogging in the pipe by the powder active material can be suppressed. Therefore, a flow battery having a long cycle life can be realized.

In the flow battery 3000 according to the third embodiment, lithium may be dissolved in the second liquid 120.

The second active material 320 may be a material having a property of occluding and releasing lithium.

During the charge of the flow battery 3000, electrons are supplied to the second electrode 220 from the outside of the flow battery 3000. During the charge of the flow battery 3000, the charge mediator 121 is reduced on the second electrode 220. Furthermore, during the charge of the flow battery 3000, the charge mediator 121 which has been reduced on the second electrode 220 may be oxidized by the second active material 320 and the second active material 320 may occlude lithium.

During the discharge of the flow battery 3000, electrons are emitted from the second electrode 220 to the outside of the flow battery 3000. During the discharge of the flow battery 3000, the second active material 320 which has occludes lithium reduces the discharge mediator 122 and the second active material 320 releases lithium. Further, during the discharge of the flow battery 3000, the discharge mediator 122 which has been reduced by the second active material 320 may be oxidized on the second electrode 220.

As the second active material 320, for example, an active material having a property of reversibly occluding and releasing lithium and/or lithium ions can be used. Thereby, material design of the second active material 320 is easier. Higher capacity can be realized.

During the charge of the flow battery 3000 in the third embodiment, the discharge mediator 122 may be reduced on the second electrode 220.

During the discharge, the charge mediator 121 may be oxidized on the second electrode 220.

In other words, during the charge and during the discharge, the discharge mediator 122 is reduced and oxidized on the second electrode 220, respectively. In this way, a higher energy density and a higher capacity can be realized. In other words, by reducing the discharge mediator 122 by the second electrode 220 during the charge, the amount of the discharge mediator 122 which is oxidized by the second electrode 220 during the discharge can be increased. Furthermore, by oxidizing the charge mediator 121 by the second electrode 220 during the discharge, the amount of the charge mediator 121 which is reduced by the second electrode 220 during the charge can be increased. Thereby, the capacity of the charge/discharge can be increased.

In the flow battery 3000 according to the third embodiment, the charge mediator 121 and the discharge mediator 122 may be an aromatic compound or a condensed aromatic compound. The discharge mediator 122 may be an amine compound such as ethylenediamine, for example.

The second liquid 120 in which the aromatic compound has been dissolved has a property of releasing solvated electrons from lithium and dissolving lithium as a cation.

Since the charge mediator 121 and the discharge mediator 122 are aromatic compounds, the charge mediator 121 and the discharge mediator 122 each of which has a property of low potential can be realized. The solution including an aromatic compound has an ability to dissolve lithium, for example. The solution including the aromatic compound may be, for example, an ether solution. Lithium tends to release electrons and become cations. As a result, lithium gives the electrons to the aromatic compound in the solution to become a cation and dissolve in the solution. At this time, the aromatic compound which has received the electrons is solvated with the electrons. The aromatic compounds behave as anions by being solvated with the electrons. As a result, the solution itself including the aromatic compound has ionic conductivity. Here, equivalent amounts of Li cations and electrons are present in the solution including the aromatic compound. As a result, the solution itself including the aromatic compound can have a strongly reduction property, in other words, has a property of low potential.

For example, an electrode that does not react with lithium is immersed in the second liquid 120 in which the aromatic compound has been dissolved, and then, the potential with respect to lithium metal is measured. In this case, a considerably low potential is observed. The observed potential is determined by a degree of the solvation of the aromatic compound and the electrons, namely, the kind of the aromatic compound. Example of the aromatic compounds that generate the low potential include phenanthrene, biphenyl, o-terphenyl, triphenylene, anthracene, phenanthroline, 2,2'-bipyridyl, benzophenone, trans-stilbene, 4,4'-bipyridyl, 3,3'-bipyridyl, 2,4'-bipyridyl, 2,3'-bipyridyl, cis-stilbene, acetophenone, propiophenone, butyrophenone, valerophenone, and ethylenediamine.

In the flow battery 3000 according to the third embodiment, the charge mediator 121 may be at least one selected from the group consisting of phenanthrene, biphenyl, o-terphenyl, triphenylene, and anthracene.

If the charge mediator 121 is at least one selected from the above group, the charge mediator 121 having a property of low potential can be realized. More specifically, a charge mediator has a potential (V vs. Li/Li$^+$) which is lower than the potential (V vs. Li/Li$^+$) of the specific second active material 320 can be realized. The second active material 320 may be, for example, graphite.

In the flow battery 3000 according to the third embodiment, the discharge mediator 122 may be at least one selected from the group consisting of phenanthroline, 2,2'-bipyridyl, benzophenone, trans-stilbene, 4,4'-bipyridyl, 3,3'-bipyridyl, 2,4'-bipyridyl, 2,3'-bipyridyl, cis-stilbene, acetophenone, propiophenone, butyrophenone, valerophenone, and ethylenediamine.

If the discharge mediator 122 is at least one selected from the above group, the discharge mediator 122 having a property of high potential can be realized. More specifically, the discharge mediator 122 which has a potential (V vs. Li/Li$^+$) which is higher than the potential (V vs. Li/Li$^+$) of the specific second active material 320 can be realized. The second active material 320 may be, for example, graphite.

In the flow battery 3000 according to the third embodiment, the discharge mediator 122 may be at least one selected from the group consisting of 2,2'-bipyridyl, trans-stilbene, 2,4'-bipyridyl, 2,3'-bipyridyl, cis-stilbene, propiophenone, butyrophenone, valerophenone, and ethylenediamine.

If the discharge mediator 122 is at least one selected from the above group, the equilibrium potential (V vs. Li/Li$^+$) of the discharge mediator 122 can be made relatively low. Thereby, an anode of the flow battery having a lower potential can be realized. As a result, the flow battery which has a higher battery voltage can be realized.

In the flow battery 3000 according to the third embodiment, the second liquid 120 may be an ether solution.

If the second liquid 120 is an ether solution, an electrolyte liquid including the charge mediator 121 and the discharge mediator 122 can be realized as the second liquid 120. In other words, the ether solution itself can have a property as an electrolyte liquid, since the solvent of the charge mediator 121 and the discharge mediator 122 is an ether solution, which has no electronic conductivity.

Examples of the ethers include tetrahydrofuran (THF), 2-methyltetrahydrofuran (2MeTHF), dimethoxyethane (DME), 1,3-dioxane (1,3DO), and 4-methyl-1,3-dioxane (4Me1,3DO).

In the flow battery 3000 according to the third embodiment, the second active material 320 may be graphite.

If the second active material 320 is graphite, the equilibrium potential (V vs. Li/Li$^+$) of the second active material 320 can be made relatively low. Therefore, a substance having a relatively low equilibrium potential (V vs. Li/Li$^+$) can be used as the discharge mediator 122. The substance which has a relatively low equilibrium potential and can be used as the discharge mediator 122 may be, for example, an aromatic compound or a condensed aromatic compound. Thereby, the anode of the flow battery having a lower potential can be realized. As a result, a flow battery having a high battery voltage can be realized.

In the third embodiment, as the second active material 320, the composition of the graphite which has occluded lithium, namely, the composition of the graphite intercalation compound generated during the charge may be at least one of $C_{24}Li$, $C_{18}Li$, $C_{12}Li$, and $C_6Li$.

If graphite is used as the second active material 320, graphite reacts with lithium and is completely reduced and the charge is performed. In other words, graphite occludes lithium to be $C_6Li$. At this time, the potential of this $C_6Li$ is approximately 0.2 V vs. Li/Li$^+$. As a result, a mediator-type anode can be provided by using the aromatic compound having a potential which is lower than the potential of $C_6Li$ as the charge mediator and by using the aromatic compound having a potential which is higher than the potential of $C_6Li$ as the discharge mediator.

Table 2 shows potentials of the aromatic compounds including the condensed aromatic compounds which can be used as the charge mediator 121.

TABLE 2

| Compound | Molar concentration (mol/L) | Electric Potential (v vs. Li/Li+) |
|---|---|---|
| phenanthrene 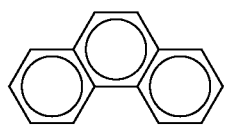 | 1 | 0.03 |
| biphenyl 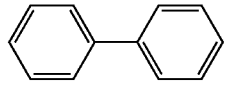 | 1 | 0 |
| o-terphenyl 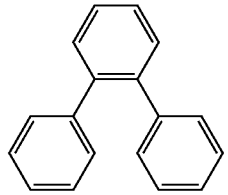 | 1 | 0.15 |
| triphenylene 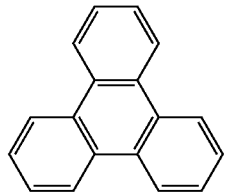 | 0.1 | 0.01 |
| anthracene 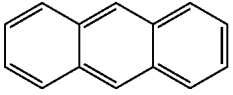 | 0.1 | 0.05 |

Table 3 shows potentials of the aromatic compounds including the condensed aromatic compounds and potentials of the amine compounds, both of which can be used as the discharge mediator 122.

TABLE 3

| Compound | Molar concentration (mol/L) | Electric potential (V vs. Li/Li+) |
|---|---|---|
| Phenanthroline 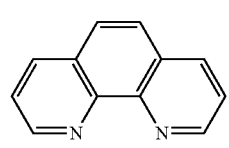 | 0.1 | 1.78 |
| 2,2'-bipyridyl 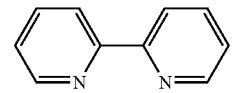 | 1 | 0.4 |
| Benzophenone 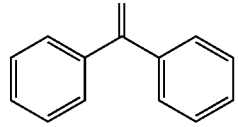 | 1 | 0.78 |
| trans-stilbene 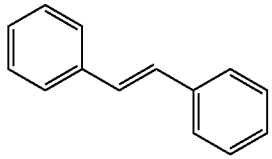 | 0.5 | 0.3 |
| 4,4'-bipyridyl 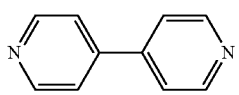 | 0.1 | 1.22 |
| 3,3'-bipyridyl 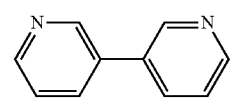 | 0.1 | 2.5 |
| 2,4'-bipyridyl 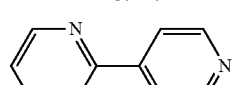 | 0.1 | 0.54 |
| 2,3'-bipyridyl 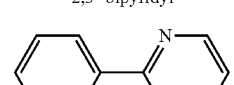 | 0.1 | 0.58 |
| cis-stilbene 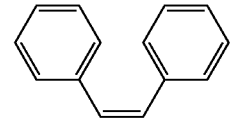 | 0.1 | 0.43 |

TABLE 3-continued

| Compound | Molar concentration (mol/L) | Electric potential (V vs. Li/Li+) |
| --- | --- | --- |
| Acetophenone | 0.1 | 1.29 |
| Propiophenone | 0.1 | 0.42 |
| Butyrophenone | 0.1 | 0.3 |
| Valerophenone | 0.1 | 0.31 |
| Ethylenediamine | 0.1 | 0.36 |

A whole of 2×2 cm copper foil wrapped with a polypropylene microporous separator is wrapped with a large amount of lithium metal foil. A tab is attached to the copper foil and the lithium metal. Subsequently, a laminate wrapping is attached thereto. A solution of 2MeTHF in which one compound shown in Table 2 and Table 3 has been dissolved at the molar concentration thereof (mol/L) is injected thereto, and then the laminate wrapping is heat-sealed and sealed. As described above, cells for potential measurement are prepared for each compound. Tables 2 and 3 show potentials (V vs. Li/Li$^+$) measured on the basis of the lithium metal using these potential measurement cells. In this measurement, 2MeTHF may be used as the ether, but other ethers may be used as well.

The charge mediator 121 has no ability to dissolve Li included in $C_6Li$. On the other hand, the discharge mediator 122 has an ability to dissolve Li included in $C_6Li$. This difference in ability can be explained on the basis of the difference between the potential of these lithium metal solutions and the potential of $C_6Li$. In other words, a substance having a potential which is higher than the potential of $C_6Li$ (approximately 0.2 V vs. Li/Li$^+$) has an ability to dissolve Li included in $C_6Li$, whereas, a substance having a potential which is lower than the potential of $C_6Li$ has no ability to dissolve Li included in $C_6Li$.

Therefore, the substance having a potential which is lower than the potential of $C_6Li$ can be used as the charge mediator 121. The substance having a potential which is higher than the potential of $C_6Li$ can be used as the discharge mediator 122.

The smaller the potential difference between the aromatic compound and the second active material 320 is, the better the charge/discharge energy efficiency of the aromatic compound is. Therefore, if graphite is used as the second active material 320, the charge mediator 121 may be phenanthrene, triphenylene, or biphenyl. As the discharge mediator 122, trans-stilbene, butyrophenone, valerophenone, or ethylenediamine may be used. Thereby, the charge/discharge energy efficiency can be further improved.

As the ether, an ether which is not co-inserted into graphite with Li ions may be used. Thereby, ether is not co-inserted into graphite, and the capacity density can be further improved.

A solid active material may be used as the second active material 320. The solid active material may be, for example, a powder active material. In the case where the tank is filled with the second active material 320 in a powder state without processing, the manufacturing can be simplified and the manufacturing cost can be reduced.

As the second active material 320, a pellet-shaped active material may be used. The pellet-shaped active material may be, for example, an active material provided by pelletizing powder. If the tank is filled with the second active material 320 in the form of pellets, the manufacturing can be simplified and the manufacturing cost can be reduced.

As the second active material 320, an active material hardened in a pellet shape with a known binder may be used. The binder may be, for example, polyvinylidene fluoride, polypropylene, polyethylene, or polyimide.

The second active material 320 may be a material which is insoluble in the second liquid 120. As a result, a flow battery in which the charge mediator 121 and the discharge mediator 122 are circulated together with the second liquid 120, however, the second active material 320 is not circulated can be realized.

In the flow battery 3000 according to the third embodiment, the second electrode 220 may be included in the anode, and the first electrode 210 may be included in the cathode.

In the flow battery 3000 according to the third embodiment, for example, the second liquid 120 is brought into contact the second electrode 220, and the charge mediator 121 and the discharge mediator 122 are oxidized or reduced by the second electrode 220. In other words, for example, the second liquid 120 is brought into contact the second active material 320, and either the reduction reaction of the discharge mediator 122 by the second active material 320 occurs, or the oxidation reaction of the charge mediator 121 by the second active material 320 occurs.

The second electrode 220 may be an electrode having a surface that acts as a reaction field for the charge mediator 121 and the discharge mediator 122.

In this case, a material which is stable with respect to the second liquid 120 may be used as the second electrode 220. The material which is stable with respect to the second liquid 120 may be a material which is insoluble in the second liquid 120. Furthermore, a material which is stable against an electrochemical reaction which is an electrode reaction may be used as the second electrode 220. For example, as the second electrode 220, a metal or carbon may be used. The metal may be, for example, stainless steel, iron, copper, or nickel.

The second electrode 220 may have a structure with an increased surface area. Example of the structure having the increased surface area may be a mesh, a nonwoven fabric, a surface roughening process board, or a sintered porous body, for example. These increase the surface area of the second electrode 220. Thereby, the oxidation reaction or the reduction reaction of the charge mediator 121 and the discharge mediator 122 can be further facilitated.

The flow battery 3000 in the third embodiment may further comprise a second circulation mechanism 520.

The second circulation mechanism 520 circulates the second liquid 120 between the second electrode 220 and the second active material 320.

Using the second circulation mechanism 520, the charge mediator 121 and the discharge mediator 122 can be circulated together with the second liquid 120 between the second electrode 220 and the second active material 320. Thereby, the oxidation reaction and reduction reaction between each material can be performed more efficiently.

For example, the second circulation mechanism 520 may comprise a pipe, a tank, a pump, and a valve.

A specific example of the second circulation mechanism 520 will be described later in the fourth embodiment.

<Description of Charge/Discharge Process>

The charge/discharge process of the flow battery 3000 in the third embodiment will be described based on the following operation example.

In the present operation example, the first electrode 210 is a cathode electrode and is carbon black.

In the present operation example, the first liquid 110 is an ether solution in which the first electrode mediator 111 has been dissolved.

In the present operation example, the first electrode mediator 111 is perylene or the derivative of perylene.

In the present operation example, the first active material 310 is lithium iron phosphate ($LiCoO_2$).

In the present operation example, the second electrode 220 is an anode electrode and is stainless steel.

In the present operation example, the second liquid 120 is an ether solution in which the charge mediator 121 and the discharge mediator 122 have been dissolved.

In the present operation example, the charge mediator 121 of the second electrode 220 is one kind of condensed aromatic compound (hereinafter, referred to as ChMd).

In the present operation example, the discharge mediator 122 of the second electrode 220 is one kind of condensed aromatic compound (hereinafter, referred to as DchMd).

In the present operation example, the second active material 320 is graphite.

In the present operation example, the separation part 400 is a lithium ion conductive solid electrolyte membrane.

[Description of Charge Process]

First, the charge reaction will be described.

The charge is performed by applying a voltage between the first electrode 210 and the second electrode 220.

(Reaction on Anode)

By applying the voltage, electrons are supplied from the outside of the flow battery to the second electrode 220 which is the anode. As a result, a reduction reaction between the charge mediator 121 and the discharge mediator 122 occurs on the second electrode 220.

For example, in the present operation example, the following reaction occurs.

$$ChMd + Li^+ + e^- \rightarrow ChMd.Li$$

$$DchMd + Li^+ + e^- \rightarrow DchMd.Li$$

The charge mediator 121 which has been reduced on the second electrode 220 is moved to the second active material 320 by the second circulation mechanism 520. In other words, the charge mediator 121 which has been reduced on the second electrode 220 is supplied to the second active material 320 by the second circulation mechanism 520.

At this time, the charge mediator 121 which has been reduced on the second electrode 220 is oxidized by the second active material 320. In other words, the second active material 320 is reduced by the charge mediator 121. Thereby, the second active material 320 occludes lithium to be $C_6Li$.

For example, in the present operation example, the following reaction occurs.

$$6C + ChMd.Li \rightarrow C_6Li + ChMd$$

The charge mediator 121 which has been oxidized by the second active material 320 is moved to the second electrode 220 by the second circulation mechanism 520. In other words, the charge mediator 121 which has been oxidized by the second active material 320 is supplied to the second electrode 220 by the second circulation mechanism 520.

As described above, the charge mediator 121 does not change, if viewed from the total reaction including the circulation.

On the other hand, the second active material 320 located in the place away from the second electrode 220 will be in the charged state.

(Reaction on Cathode)

By application of the voltage, oxidation reaction of the first electrode mediator 111 occurs on the first electrode 210 included in the cathode. In other words, the first electrode mediator 111 is oxidized on the surface of the first electrode 210. Thereby, electrons are emitted from the first electrode 210 to the outside of the flow battery.

For example, in the present operation example, the following reaction occurs.

$$Perylene \rightarrow Perylene^+ + e^-$$

The first electrode mediator 111 which has been oxidized on the first electrode 210 is moved to the first active material 310 by the first circulation mechanism 510. In other words, the first electrode mediator 111 which has been oxidized on the first electrode 210 is supplied to the first active material 310 by the first circulation mechanism 510.

At this time, the first electrode mediator 111 which has been oxidized on the first electrode 210 is reduced by the first active material 310. In other words, the first active material 310 is oxidized by the first electrode mediator 111. As a result, the first active material 310 releases lithium.

For example, in the present operation example, the following reaction occurs.

$$LiCoO_2 + Perylene^+ \rightarrow CoO_2 + Li^+ + Perylene^+$$

The first electrode mediator 111 which has been reduced by the first active material 310 is moved to the first electrode 210 by the first circulation mechanism 510. In other words, the first electrode mediator 111 which has been reduced by the first active material 310 is supplied to the first electrode 210 by the first circulation mechanism 510.

At this time, the first electrode mediator 111 is oxidized on the surface of the first electrode 210.

For example, in the present operation example, the following reaction occurs.

$$Perylene \rightarrow Perylene^+ + e^-$$

A part of the generated lithium ions ($Li^+$) may be moved to the second electrode 220 through the separation part 400.

As described above, the first electrode mediator 111 does not change, if viewed from the total reaction including the circulation.

On the other hand, the first active material 310 located in the place away from the first electrode 210 will be in the charged state.

As described above, on the first electrode 210, $Perylene^+$ plays a role of the charge mediator as the first electrode charge mediator.

In the fully charged state, $Perylene^+$ is present in the first liquid 110, and the first active material 310 is $LiCoO_2$. At this time, the charge potential is determined by the oxidation potential to $Perylene^+$.

The above charge reaction can proceed, until either the first active material 310 reaches the fully charged state or the second active material 320 reaches the fully charged state.

[Description of Discharge Process]

Next, the discharge reaction from full charge will be described.

In the full charge, the first active material 310 and the second active material 320 are in the charged state.

In the discharge reaction, electric power is extracted from between the first electrode 210 and the second electrode 220.

(Reaction on Anode)

Due to the discharge of the battery, an oxidation reaction between the charge mediator 121 and the discharge mediator 122 occurs on the second electrode 220 included in the anode. Thereby, electrons are emitted from the second electrode 220 to the outside of the flow battery.

For example, in the present operation example, the following reaction occurs.

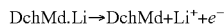

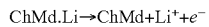

The discharge mediator 122 which has been oxidized on the second electrode 220 is moved to the second active material 320 by the second circulation mechanism 520. In other words, the discharge mediator 122 which has been oxidized on the second electrode 220 is supplied to the second active material 320 by the second circulation mechanism 520.

At this time, the discharge mediator 122 which has been oxidized on the second electrode 220 is reduced by the second active material 320. In other words, the second active material 320 is oxidized by the discharge mediator 122. As a result, the second active material 320 releases lithium.

For example, in the present operation example, the following reaction occurs.

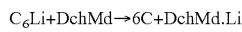

The discharge mediator 122 which has been reduced by the second active material 320 is moved to the second electrode 220 by the second circulation mechanism 520. In other words, the discharge mediator 122 which has reduced by the second active material 320 is supplied to the second electrode 220 by the second circulation mechanism 520.

As described above, the discharge mediator 122 does not change, if viewed from the total reaction including the circulation.

On the other hand, the second active material 320 located in the place away from the second electrode 220 will be in the discharged state.

(Reaction on Cathode)

By discharging the battery, electrons are supplied from the outside of the flow battery to the first electrode 210 included in the cathode. As a result, a reduction reaction of the first electrode mediator 111 occurs on the first electrode 210. In other words, the first electrode mediator 111 is reduced on the surface of the first electrode 210.

For example, in the present operation example, the following reaction occurs.

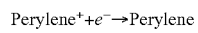

The first electrode mediator 111 which has been reduced on the first electrode 210 is moved to the first active material 310 by the first circulation mechanism 510. In other words, the first electrode mediator 111 which has been reduced on the first electrode 210 is supplied to the first active material 310 by the first circulation mechanism 510.

At this time, the first electrode mediator 111 which has been reduced on the first electrode 210 is oxidized by the first active material 310. In other words, the first active material 310 is reduced by the first electrode mediator 111. Thereby, the first active material 310 occludes lithium.

For example, in the present operation example, the following reaction occurs.

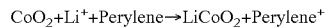

The first electrode mediator 111 which has been oxidized by the first active material 310 is moved to the first electrode 210 by the first circulation mechanism 510. In other words, the first electrode mediator 111 which has been oxidized by the first active material 310 is supplied to the first electrode 210 by the first circulation mechanism 510.

At this time, the first electrode mediator 111 is reduced on the surface of the first electrode 210.

For example, in the present operation example, the following reaction occurs.

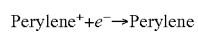

A part of the lithium ions ($Li^+$) may be supplied from the second electrode 220 through the separation part 400.

As described above, the first electrode mediator 111 does not change, if viewed from the total reaction including the circulation.

On the other hand, the first active material 310 located in the place away from the first electrode 210 will be in the discharged state.

As described above, in the first electrode 210, Perylene plays a roll of the discharge mediator as the first electrode discharge mediator.

In the fully discharged state, Perylene is present in the first liquid 110, and the first active material 310 is $LiCoO_2$. In this case, the discharge potential is determined by the reduction potential to Perylene.

The above discharge reaction can proceed, until either the first active material 310 reaches the fully discharged state or the second active material 320 reaches the fully discharged state.

<Estimation of Energy Density>

The estimation result of the energy density of the flow battery 3000 in the third embodiment will be described below.

Table 4 shows the estimation result of the energy density of the flow battery 3000 in the third embodiment.

TABLE 4

| Cathode charge mediator | 1,4-di(tert-butyl)-2,5-dimethoxybenzene | 1,4-di(tert-butyl)-2,5-dimethoxybenzene | TTF |
|---|---|---|---|
| Cathode discharge mediator | 1,1'-dibromoferrocene | Perylene | TTF |
| Potential of Cathode charge mediator (V vs. Li/Li$^+$) | 4.03 | 4.03 | 3.64 |
| Potential of Cathode discharge mediator (V vs. Li/Li$^+$) | 3.85 | 3.78 | 3.29 |
| Potential of Anode charge mediator (V vs. Li/Li$^+$) | 0.03 | 0.03 | 0.03 |
| Potential of Anode discharge mediator (V vs. Li/Li$^+$) | 0.30 | 0.30 | 0.3 |
| Charge voltage of Flow battery (V) | 4.00 | 4.00 | 3.61 |
| Discharge voltage of Flow battery (V) | 3.55 | 3.48 | 2.99 |
| Theoretical capacity density of Flow battery (Ah/L) | 361.04 | 361.04 | 353.52 |
| Theoretical energy density of Flow battery (Wh/L) | 1281.71 | 1256.43 | 1055.95 |
| Volume filling factor of Electric power generation element | 0.60 | 0.60 | 0.6 |
| Energy density of Flow battery (Wh/L) | 769.02 | 753.86 | 633.57 |

Anode: Graphite
Cathode: LiMn$_2$O$_4$
Cathode charge mediator: 1,4-di(tert-butyl)-2,5-dimethoxy benzene (4.3 to 4.4 V)
Cathode discharge mediator: Perylene (3.85 V), 1,1'-dibromoferrocene (3.78 V)
Anode charge mediator: Phenanthrene (0.03 V)
Anode discharge mediator: trans-stilbene (0.3 V)
In the case of TTF, LiFePO$_4$ is used for the cathode solid active material Table 4 is a case where perylene shown in Table 1 was used as the discharge mediator of the first electrode mediator 111, and 1,1'-dibromoferrocene was used as the cathode discharge mediator in a case of the cathode discharge mediator which exhibits a one-step redox reaction. In addition to this condition, shown is the estimation result of the energy density in a case where the condition of the above-described operation example of the flow battery 3000 in the third embodiment is satisfied, and where the anode charge mediator 121 and the anode discharge mediator 122 are phenanthrene and trans-stilbene, respectively. In Table 4, the volume filling factor of the electric power generation element represents a ratio. For example, the volume filling factor of the power generation element of 0.60 means 60%.

In Table 4, in the calculation example using tetrathiafulvalene as the first electrode mediator 111, namely, as the cathode charge mediator, the cathode solid active material is LiFePO$_4$, and 1,1'-dibromoferrocene is not used. This is because tetrathiafulvalene (TTF) also functions as the cathode discharge mediator.

As shown in Table 4, if perylene is used as the charge mediator and a cyclopentadienyl compound such as 1,1'-dibromoferrocene is used as the first electrode mediator 111 which serves as the discharge mediator, a flow battery having an energy density of approximately 769 Wh/L can be realized.

On the other hand, the theoretical energy density of a conventional flow battery using vanadium is approximately 38 Wh/L. From this result, it can be seen that the theoretical energy density of the flow battery of the present disclosure is much higher than that of the conventional flow battery.

As shown in Table 4, if tetrathiafulvalene is used as the first electrode mediator 111, a flow battery having an energy density of approximately 633 Wh/L is provided, since LiFePO$_4$ is used as the cathode solid active material. From this result, it can be seen that the theoretical energy density of the flow battery using the derivative of perylene is higher than the theoretical energy density of the flow battery using tetrathiafulvalene or the derivative thereof.

Fourth Embodiment

Hereinafter, the fourth embodiment will be described. The description which has been set forth in the first to third embodiments will be omitted as appropriate.

Figure 4:
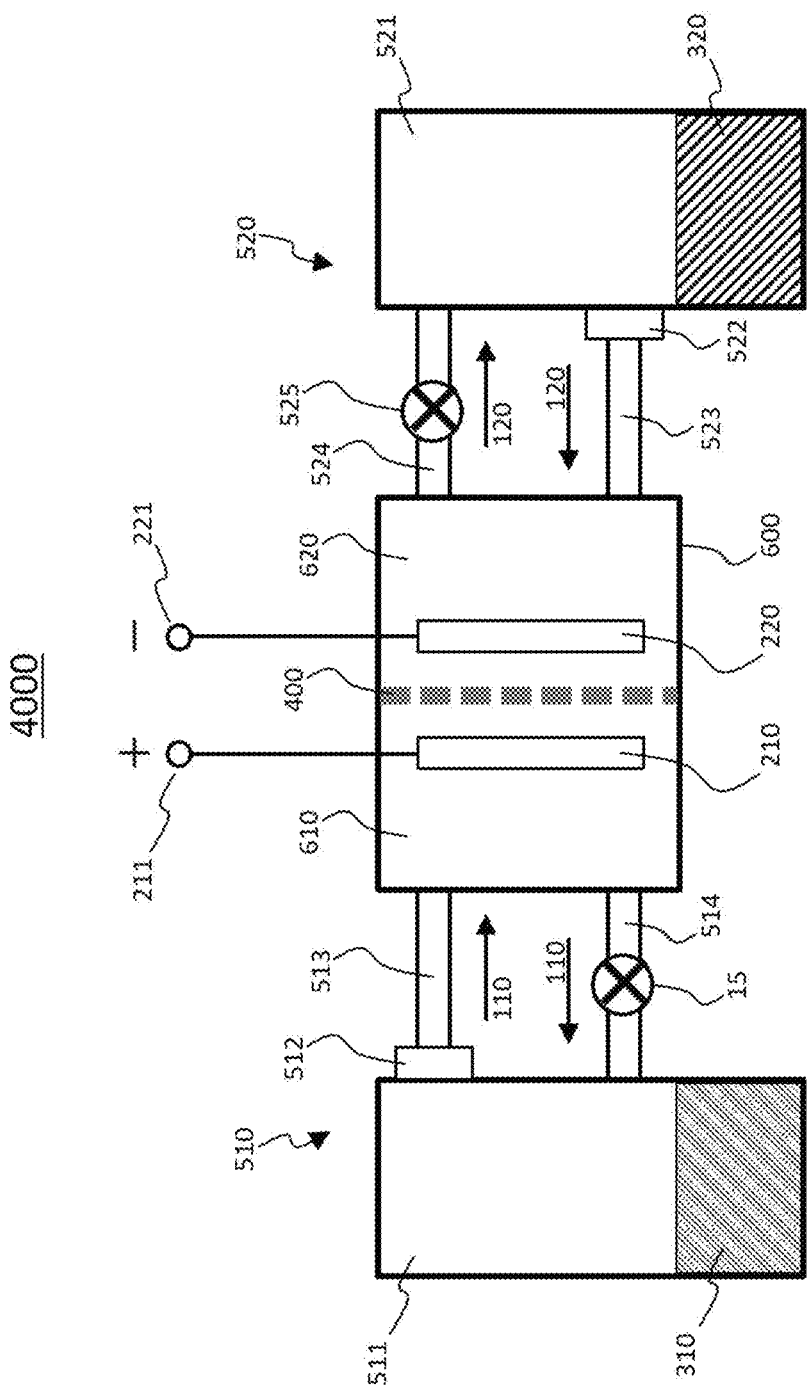
FIG. 4 shows a schematic diagram of a flow battery in a fourth embodiment.

FIG. 4 shows a schematic diagram of a flow battery 4000 in the fourth embodiment.

The flow battery 4000 in the fourth embodiment comprises not only the flow battery 3000 in the third embodiment but also the first circulation mechanism 510 shown in the second embodiment.

Furthermore, the flow battery 4000 in the fourth embodiment comprises the electrochemical reaction part 600, the cathode terminal 211, and the anode terminal 221, which have been described in the second embodiment.

Furthermore, the flow battery 4000 in the fourth embodiment comprises a second circulation mechanism 520.

The anode includes a second storage part 521.

The second active material 320 is contained in the second storage part 521. A part of the second liquid 120 is contained in the second storage part 521.

The second circulation mechanism 520 circulates the second liquid 120 between the anode chamber 620 and the second storage part 521.

The second active material 320 and the second liquid 120 are brought into contact with each other in the second storage part 521 to generate either the oxidation reaction of the charge mediator 121 by the second active material 320 or the reduction reaction of the discharge mediator 122 by the second active material 320.

Since the second liquid 120 and the second active material 320 can be brought into contact with each other in the second storage part 521, a contact area between the second liquid 120 and the second active material 320 can be further increased. The contact time between the second liquid 120 and the second active material 320 can be made longer. As a result, the oxidation reaction of the charge mediator 121 by the second active material 320 and the reduction reaction of the discharge mediator 122 by the second active material 320 can be performed more efficiently.

In the fourth embodiment, the second storage part 521 may be a tank, for example.

The second storage part 521 may contain, for example, in the interspace between the filled second active materials 320, the second liquid 120 in which the charge mediator 121 and the discharge mediator 122 have been dissolved.

As shown in FIG. 4, in the flow battery 4000 in the fourth embodiment, the second circulation mechanism 520 may comprise a pipe 523, a pipe 524, and a pump 525. In order to distinguish the pipes, the pipe 523 and the pipe 524 may be referred to as a third pipe 523 and a fourth pipe 524, respectively.

One end of the pipe 523 is connected to the outlet of the second liquid 120 of the second storage part 521.

The other end of the pipe 523 is connected to a chamber which is either the cathode chamber 610 or the anode chamber 620 and in which the second electrode 220 is disposed. In FIG. 4, the other end of the pipe 523 is connected to the anode chamber 620.

The other end of the pipe 524 is connected to a chamber which is either the cathode chamber 610 or the anode chamber 620 and in which the second electrode 220 is disposed. In FIG. 4, the other end of the pipe 524 is connected to the anode chamber 620.

The other end of the pipe 524 is connected to the inlet of the second liquid 120 of the second storage part 521.

The pump 525 is provided in the pipe 524, for example. Alternatively, the pump 525 may be provided in the pipe 523.

In the flow battery 4000 in the fourth embodiment, the second circulation mechanism 520 may comprise a second filter 522.

The second filter 522 prevents the second active material 320 from passing therethrough.

The second filter 522 is provided in a path through which the second liquid 120 flows out of the second storage part 521 to the second electrode 220. In FIG. 4, the second filter 522 is provided in the pipe 523.

Using the second filter 522, the second active material 320 is prevented from flowing out of the second storage part 521 (for example, toward the second electrode 220). In other words, the second active material 320 stays in the second storage part 521. Thereby, a flow battery in which the second active material 320 itself is not circulated can be realized. As a result, clogging by the second active material 320 inside the member of the second circulation mechanism 520 can be prevented. The generation of resistance loss due to the second active material 320 flowing out to the second electrode 220 can be prevented. The member of the second circulation mechanism 520 may be a pipe, for example.

For example, the second filter 522 may be provided at a joint part between the second storage part 521 and the pipe 523.

For example, the second filter 522 may be a filter which filters the second active material 320. In this case, the filter may be a member having pores each smaller than the minimum particle size of the particles of the second active material 320. As a material of the filter, a material that does not react with the second active material 320 and the second liquid 120 may be used. The filter may be, for example, a glass fiber filter paper, a polypropylene nonwoven fabric, a polyethylene nonwoven fabric, or a metal mesh which does not react with a lithium metal.

Since the second filter 522 is used, even if the second active material 320 flows together with the flow of the second liquid 120 in the second storage part 521, the second active material 320 is prevented from flowing out of the second storage part 521.

In FIG. 4, the second liquid 120 contained in the second storage part 521 is supplied to the anode chamber 620 through the second filter 522 and the pipe 523.

As a result, the charge mediator 121 and the discharge mediator 122 which have been dissolved in the second liquid 120 are oxidized or reduced by the second electrode 220.

Subsequently, the second liquid 120 in which the oxidized or reduced charge mediator 121 and the oxidized or reduced discharge mediator 122 have been dissolved is supplied through the pipe 524 and the pump 525 to the second storage part 521.

As a result, with regard to the charge mediator 121 and the discharge mediator 122 which have been dissolved in the second liquid 120, either the oxidation reaction of the charge mediator 121 by the second active material 320 or the reduction reaction of the discharge mediator 122 by the second active material 320 is performed.

The control of the circulation of the second liquid 120 may be performed by the pump 525, for example. In other words, the pump 525 appropriately starts the supply of the second liquid 120, stops the supply, or adjusts the supply amount.

The control of the circulation of the second liquid 120 may be performed by a means other than the pump 525. The means may be a valve, for example.

In FIG. 4, as one example, the first electrode 210 is included in the cathode, and the second electrode 220 is included in the anode.

The perylene or the derivative thereof of the present disclosure allows a flow battery having a discharge potential and an energy density which are higher than those of a flow battery using a conventional tetrathiafulvalene derivative as a mediator and $LiFePO_4$ as a cathode solid active material to be realized.

The contents described in each of the first to fourth embodiments may be combined with each other as appropriate.

EXAMPLES

Next, the flow battery according to the present disclosure will be described more specifically with reference to examples.

Inventive Example 1

$LiBF_4$ was dissolved in propylene carbonate to provide an electrolyte liquid. $LiBF_4$ had a concentration of 1 mol/L and functioned as an electrolyte.

Perylene was dissolved in the electrolyte liquid so as to have a concentration of 10 mmol/L to provide an electrolyte liquid including perylene.

A counter electrode, a working electrode, and a reference electrode were brought into contact with the electrolyte liquid including perylene to produce a potential measurement cell.

The counter electrode was 1×1 cm Pt foil.

The working electrode was a glassy carbon electrode (diameter: 6 mm).

The reference electrode was a silver wire.

Using an electrochemical analyzer (provided from BAS Inc., trade name: ALS-612E), in the potential measurement cell, while the potential with respect to $Li/Li^+$ was varied within a range of not less than 3.15 volts and not more than 4.25 volts, the current density of perylene was measured by a cyclic voltammetry method.

The potential scanning rate (i.e., scanning speed) was 50 mV/s.

FIG. 5 shows the results of the cyclic voltammetry in the inventive example 1. As shown in FIG. 5, the positive current density of perylene is approximately equal to the negative current density thereof. This reveals that the reversibility of the redox reaction of perylene is high. Therefore, perylene and the derivative thereof are suitable as a mediator of a flow battery.

Comparative Example 1

An experiment similar to the inventive example 1 was performed, except that naphthalene was used in place of perylene. FIG. 6 shows the results of the cyclic voltammetry in the comparative example 1. As shown in FIG. 6, the positive current density of naphthalene is significantly greater than the negative current density thereof. This reveals that the reversibility of the redox reaction of naphthalene is low. Therefore, naphthalene is not suitable as a mediator of a flow battery.

Comparative Example 2

An experiment similar to the inventive example 1 was performed, except that anthracene was used in place of perylene. FIG. 7 shows the results of the cyclic voltammetry in the comparative example 2. As shown in FIG. 7, the positive current density of anthracene is significantly greater than the negative current density thereof. This reveals that the reversibility of the redox reaction of anthracene is low. Therefore, anthracene is not suitable as a mediator of a flow battery.

INDUSTRIAL APPLICABILITY

The flow battery of the present disclosure can be suitably used as, for example, an electricity storage device or an electricity storage system.

REFERENCE SIGNS LIST

110 First liquid
111 First electrode mediator
120 Second liquid
121 Charge mediator
122 Discharge mediator
210 First electrode
211 Cathode terminal
220 Second electrode
221 Anode terminal
310 First active material
320 Second active material
400 Separation part
510 First circulation mechanism
511 First storage part
512 First filter
513, 514, 523, 524 Pipe
515, 525 Pump
520 Second circulation mechanism
521 Second storage part
522 Second filter
600 Electrochemical reaction part
610 Cathode chamber
620 Anode chamber
1000, 2000 3000, 4000 Flow battery

The invention claimed is:

1. A flow battery, comprising:
an anode;
a cathode; and
a separator disposed between the anode and the cathode, wherein:
the cathode comprises a first electrode, a first liquid, a first active material, and a first circulation mechanism,
the first liquid is in contact with the first active material and the first electrode,
the first circulation mechanism is configured to circulates the first liquid between the first electrode and the first active material,
the first liquid contains perylene or the derivative thereof,
the first liquid further contains a cyclopentadienyl compound, the anode comprises a second electrode, a second liquid, a second active material, and a second circulation mechanism,
the second liquid is in contact with the second active material and the second electrode,
the second circulation mechanism is configured to circulate the second liquid between the first electrode and the second active material,
the second liquid contains a charge mediator and a second discharge mediator,
the charge mediator is at least one selected from the group consisting of phenanthrene, biphenyl, o-terphenyl, triphenylene, and anthracene, and
the separator separates the first electrode from the second electrode, and separates the first liquid from the second liquid.

2. The flow battery according to claim 1, wherein
the first liquid contains the derivative of perylene, and
the derivative of perylene is represented by the following general formula (1):

[Chem. 1]

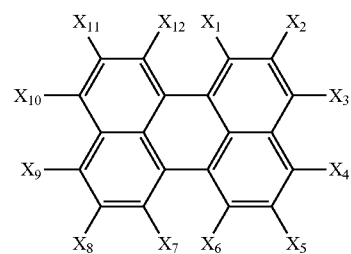

(1)

where
X1 to X12 each independently represent a hydrogen atom, a fluorine atom, a chlorine atom, a bromine atom, a cyano group, a nitro group, a chain saturated hydrocarbon group, a chain unsaturated hydrocarbon group, a cyclic saturated carbon, a cyclic unsaturated hydrocarbon group, $COR_1$, or $N(R_2)_2$; However, a case where $X_1$ to $X_{12}$ are all simultaneously hydrogen atoms is excluded; $R_1$ and $R_2$ each independently are any one of a hydrogen atom, a chain saturated hydrocarbon group, a chain unsaturated hydrocarbon group, a cyclic saturated hydrocarbon group, a cyclic unsaturated hydrocarbon group, a cyano group, or a nitro group.

3. The flow battery according to claim 1, wherein
the first liquid contains the derivative of perylene, and
the derivative of perylene is represented by the following general formula (2):

[Chem. 2]

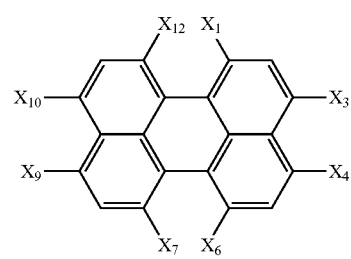

(2)

where $X_1$, $X_3$, $X_4$, $X_6$, $X_7$, $X_9$, $X_{10}$, and $X_{12}$ each independently represent a hydrogen atom, a fluorine atom, a chlorine atom, a bromine atom, a cyano group, a nitro group, a chain saturated hydrocarbon group, a chain unsaturated hydrocarbon group, a cyclic saturated carbon, a cyclic unsaturated hydrocarbon group, $COR_1$, or $N(R_2)_2$; However, a case where $X_1$, $X_3$, $X_4$, $X_6$, $X_7$, $X_9$, $X_{10}$, and $X_{12}$ are all simultaneously hydrogen atoms is excluded; $R_1$ and $R_2$ are each independently any one of a hydrogen atom, a chain saturated hydrocarbon group, a chain unsaturated hydrocarbon group, a cyclic saturated hydrocarbon group, a cyclic unsaturated hydrocarbon group, a cyano group, or a nitro group.

4. The flow battery according to claim 1, wherein
the first liquid contains the derivative of perylene, and
the derivative of perylene is represented by the following general formula (3):

[Chem. 3]

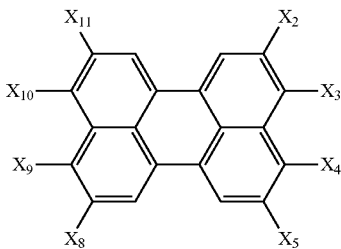

(3)

where $X_2$ to $X_5$ and $X_8$ to $X_{11}$ each independently represent a hydrogen atom, a fluorine atom, a chlorine atom, a bromine atom, a cyano group, a nitro group, a chain saturated hydrocarbon group, a chain unsaturated hydrocarbon group, a cyclic saturated carbon, a cyclic unsaturated hydrocarbon group, $COR_1$, or $N(R_2)_2$; However, a case where $X_2$ to $X_5$ and $X_8$ to $X_{11}$ are all simultaneously hydrogen atoms is excluded; $R_1$ and $R_2$ are each independently any one of a hydrogen atom, a chain saturated hydrocarbon group, a chain unsaturated hydrocarbon group, a cyclic saturated hydrocarbon group, a cyclic unsaturated hydrocarbon group, a cyano group, or a nitro group.

5. The flow battery according to claim 1, wherein
the first liquid contains the derivative of perylene, and
the derivative of perylene is represented by the following general formula (4):

[Chem. 4]

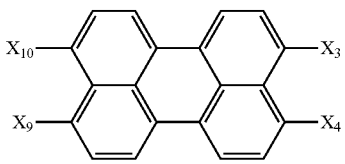

(4)

where $X_3$, $X_4$, $X_9$ and $X_{10}$ each independently represent a hydrogen atom, a fluorine atom, a chlorine atom, a bromine atom, a cyano group, a nitro group, a chain saturated hydrocarbon group, a chain unsaturated hydrocarbon group, a cyclic saturated carbon, a cyclic unsaturated hydrocarbon group, $COR_1$, or $N(R_2)_2$; However, a case where $X_3$, $X_4$, $X_9$ and $X_{10}$ are all simultaneously hydrogen atoms is excluded; $R_1$ and $R_2$ are each independently any one of a hydrogen atom, a chain saturated hydrocarbon group, a chain unsaturated hydrocarbon group, a cyclic saturated hydrocarbon group, a cyclic unsaturated hydrocarbon group, a cyano group, or a nitro group.

6. The flow battery according to claim 1, wherein
the first liquid contains perylene, and
the perylene is represented by the following general formula (5):

[Chem. 5]

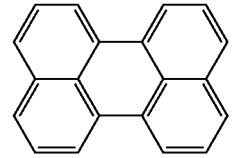

(5)

7. The flow battery according to claim 1, wherein
the perylene or the derivative thereof has a first redox potential, and
an equilibrium potential of the first active material is higher than the first redox potential.

8. The flow battery according to claim 1, wherein
the cyclopentadienyl compound is 1,1'-dibromoferrocene.

9. The flow battery according to claim 1, wherein:
the cathode further comprises a cathode chamber and a first storage part,
the cathode chamber comprises the first electrode in the inside thereof,
the first storage part comprises the first active material in the inside thereof, and
either an oxidation reaction or a reduction reaction is performed between the first active material and the perylene or the derivative thereof due to contact of the first active material and the first liquid with each other in the first storage part.

10. The flow battery according to claim 1, wherein:
the first circulation mechanism comprises a first filter, and
the first filter is provided in a path through which the first liquid flows out of the first active material to the first electrode.

11. The flow battery according to claim 1,
wherein:
an equilibrium potential of the charge mediator is lower than an equilibrium potential of the second active material, and
an equilibrium potential of the second discharge mediator is higher than an equilibrium potential of the second active material.

12. The flow battery according to claim 11, wherein:
lithium is dissolved in the second liquid,
the second active material has a property for occluding and releasing the lithium, during charge,
the charge mediator is reduced on the second electrode, and
the charge mediator which has been reduced on the second electrode is oxidized by the second active material, and the second active material occludes the lithium, and during discharge, the second active material which has occluded the lithium reduces the second discharge mediator, and the second active material releases the lithium, and the second discharge mediator which has been reduced by the second active material is oxidized on the second electrode.

13. The flow battery according to claim 12, wherein:

during the charge, the second discharge mediator is reduced on the second electrode, and during the discharge, the charge mediator is oxidized on the second electrode.

14. The flow battery according to claim 1, wherein:

the second discharge mediator are aromatic compounds, and the second liquid in which the aromatic compounds have been dissolved has a property of releasing solvated electrons from the lithium and dissolving the lithium as a cation.

15. The flow battery according to claim 1, wherein the charge mediator is at least one selected from the group consisting of phenanthrene, o-terphenyl, and triphenylene.

16. The flow battery according to claim 1 wherein the second discharge mediator is at least one selected from the group consisting of phenanthroline, 2,2'-bipyridyl, benzophenone, trans-stilbene, 4,4'-bipyridyl, 3,3'-bipyridyl, 2,4'-bipyridyl, 2,3'-bipyridyl, cis-stilbene, propiophenone, butyrophenone, valerophenone, and ethylenediamine.

17. The flow battery according to claim 1 wherein:

the anode further comprises an anode chamber and a second storage part, the anode chamber comprises the second electrode in the inside thereof, the second storage part comprises the second active material in the inside thereof, and either an oxidation reaction of the charge mediator by the second active material or a reduction reaction of the second discharge mediator by the second active material is performed due to contact of the second active material and the second liquid with each other in the second storage part.

18. The flow battery according to claim 12, wherein:

the second circulation mechanism comprises a second filter, and the second filter is provided in a path through which the second liquid flows out of the second active material to the second electrode.

* * * * *